United States Patent
Tsuchiyama et al.

(10) Patent No.: US 8,848,318 B2
(45) Date of Patent: Sep. 30, 2014

(54) MAGNETIC HEAD SLIDER APPARATUS, MAGNETIC DISK DRIVE APPARATUS, AND SUSPENSION THEREOF

(75) Inventors: Ryuji Tsuchiyama, Tokyo (JP); Takuya Matsumoto, Tokyo (JP); Irizo Naniwa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/116,601

(22) PCT Filed: May 12, 2011

(86) PCT No.: PCT/JP2011/060979
§ 371 (c)(1),
(2), (4) Date: Dec. 20, 2013

(87) PCT Pub. No.: WO2012/153421
PCT Pub. Date: Nov. 15, 2012

(65) Prior Publication Data
US 2014/0104996 A1 Apr. 17, 2014

(51) Int. Cl.
*G11B 5/60* (2006.01)
*G11B 5/48* (2006.01)
*G11B 13/08* (2006.01)
*G11B 5/00* (2006.01)

(52) U.S. Cl.
CPC .............. *G11B 13/08* (2013.01); *G11B 5/6082* (2013.01); *G11B 2005/0021* (2013.01); *G11B 5/6088* (2013.01); *G11B 5/4826* (2013.01)
USPC ..................................... 360/236.3; 360/245.1

(58) Field of Classification Search
CPC ...... G11B 5/6005; G11B 5/54; G11B 5/4826; G11B 5/4833; G11B 5/10; G11B 5/3103; G11B 21/21; G11B 5/1871
USPC .......................... 360/236.3, 235.5, 245, 245.1
See application file for complete search history.

(56) References Cited

U.S. PATENT DOCUMENTS

| 4,167,765 | A | 9/1979 | Watrous |
| 6,597,536 | B2 * | 7/2003 | Tsuchiyama et al. ...... 360/235.8 |
| 6,785,095 | B2 * | 8/2004 | Tokisue et al. ............ 360/245.1 |
| 6,937,440 | B2 | 8/2005 | Rajakumar et al. |
| 6,963,464 | B2 * | 11/2005 | Xu et al. ........................ 360/75 |
| 7,042,678 | B2 * | 5/2006 | Tsuchiyama et al. ...... 360/235.8 |

(Continued)

FOREIGN PATENT DOCUMENTS

| JP | 55-22296 A | 2/1980 |
| JP | 2004-055127 A | 2/2004 |

(Continued)

*Primary Examiner* — Brian Miller
(74) *Attorney, Agent, or Firm* — Antonelli, Terry, Stout & Kraus, LLP.

(57) ABSTRACT

Provided is a magnetic head slider apparatus that can minimize a change in a roll angle caused by an impact force even with a submount mounted on a side surface thereof and achieve steady flying with the roll angle minimized. A dimple position and a pressure center position of a lifting force are moved in a slider width direction to thereby align a center of mass of a slider having a submount including a laser diode mounted on a side surface thereof, the dimple position, and the pressure center position of the lifting force with each other. This provides a magnetic head slider and a suspension thereof, and a magnetic disk drive apparatus offering higher recording density and higher reliability.

5 Claims, 28 Drawing Sheets

(56) References Cited

U.S. PATENT DOCUMENTS

| | | | |
|---|---|---|---|
| 7,957,085 B2 * | 6/2011 | Tanaka et al. | 360/59 |
| 8,018,685 B2 * | 9/2011 | Shimazawa et al. | 360/245.3 |
| 8,065,787 B2 * | 11/2011 | Sasaki et al. | 29/603.12 |
| 8,218,405 B2 * | 7/2012 | Kurita et al. | 369/13.24 |
| 8,243,561 B2 * | 8/2012 | Matsumoto | 369/13.33 |
| 8,493,818 B2 * | 7/2013 | Tomikawa et al. | 369/13.33 |
| 8,619,516 B1 * | 12/2013 | Matsumoto | 369/13.33 |
| 2004/0156144 A1 | 8/2004 | Kang | |
| 2005/0213253 A1 | 9/2005 | Takahashi et al. | |
| 2008/0316872 A1 * | 12/2008 | Shimizu et al. | 369/13.24 |
| 2009/0266789 A1 * | 10/2009 | Shimazawa et al. | 216/22 |

FOREIGN PATENT DOCUMENTS

| | | |
|---|---|---|
| JP | 2004-241113 A | 8/2004 |
| JP | 2005-285218 A | 10/2005 |
| JP | 2007-220227 A | 8/2007 |
| JP | 2011-023093 A | 2/2011 |
| WO | 2006/082066 A1 | 8/2006 |

\* cited by examiner

FIG.1
(a)
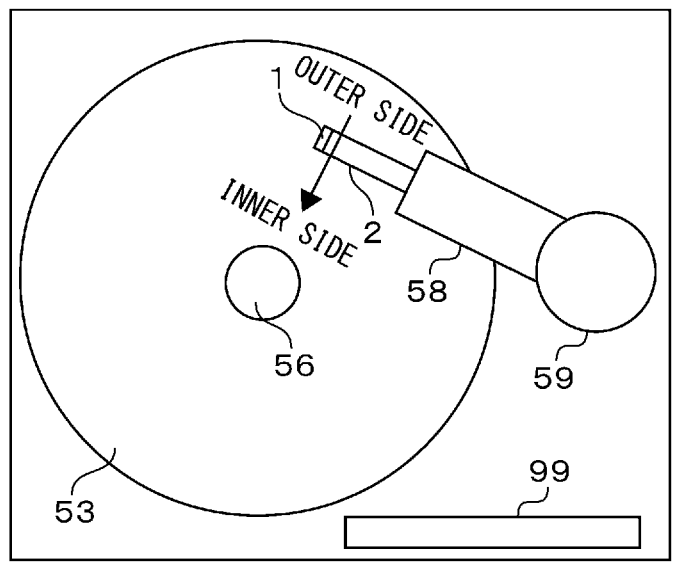
(b)
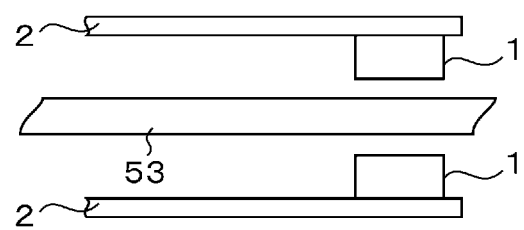

F I G . 2
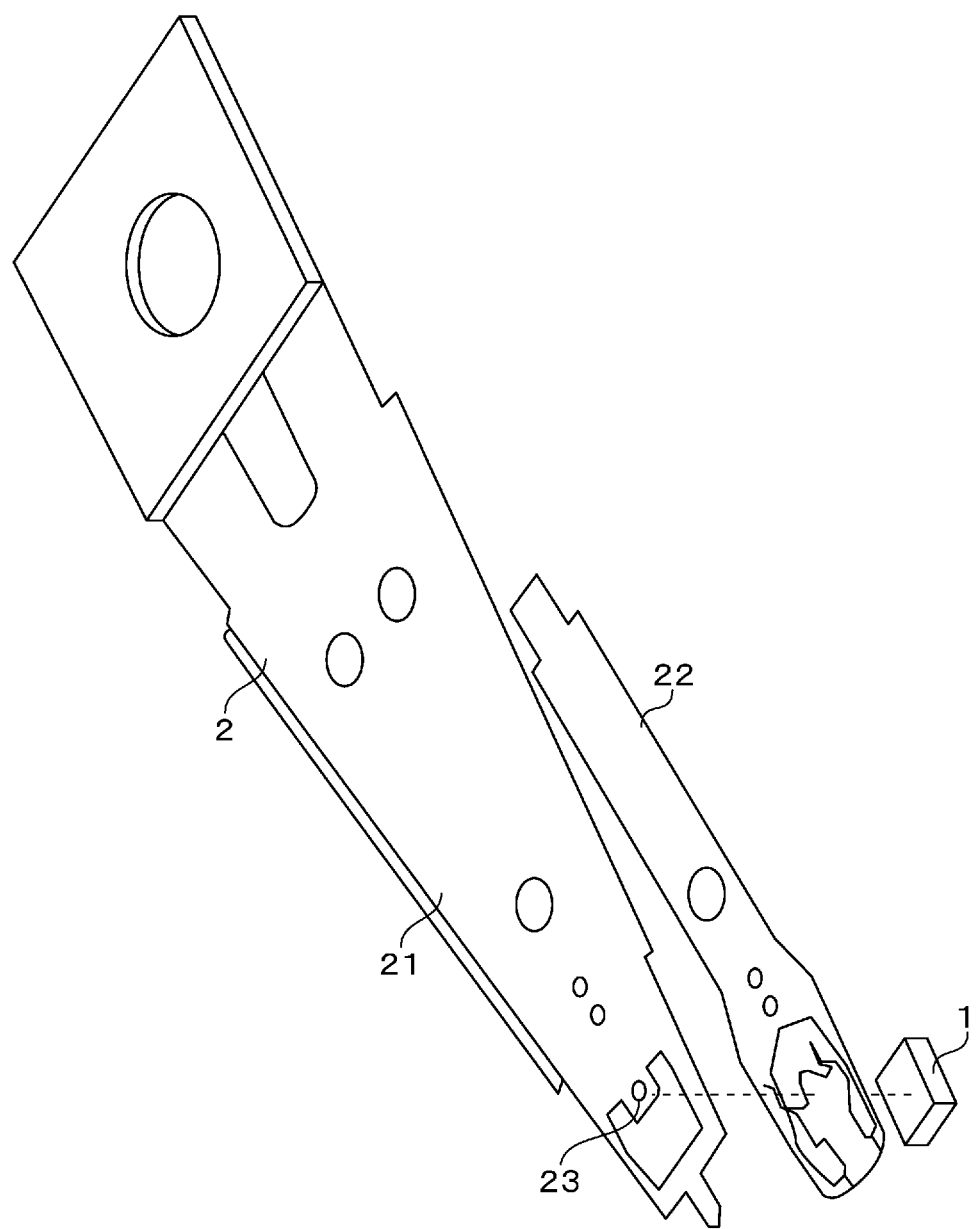

FIG. 6
(a)
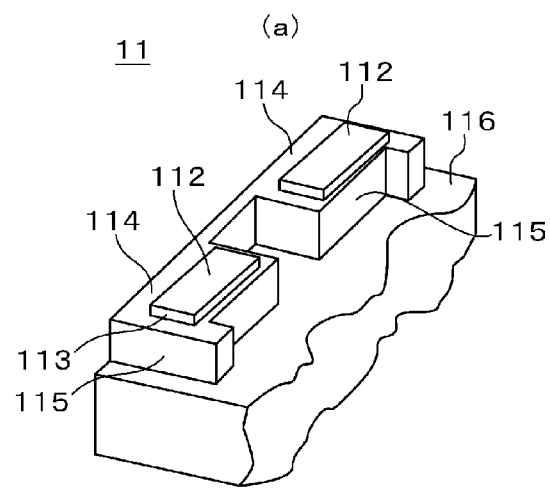
(b)
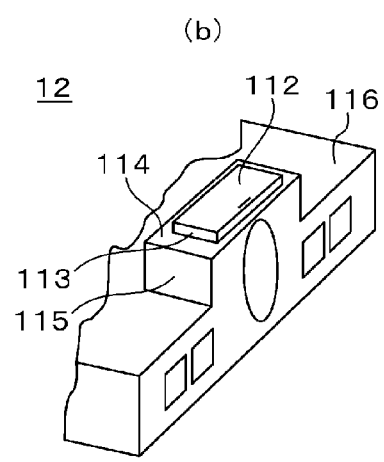
(c)
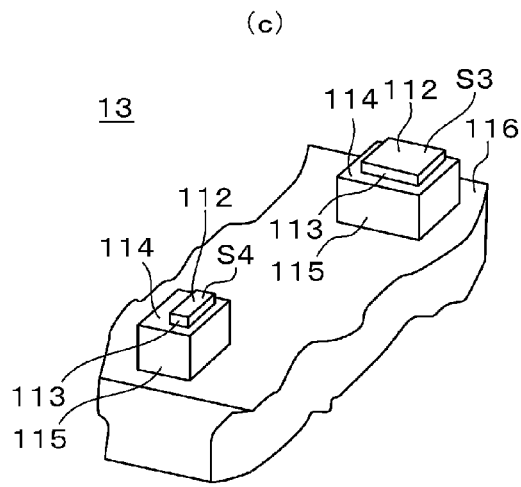

F I G . 1 3
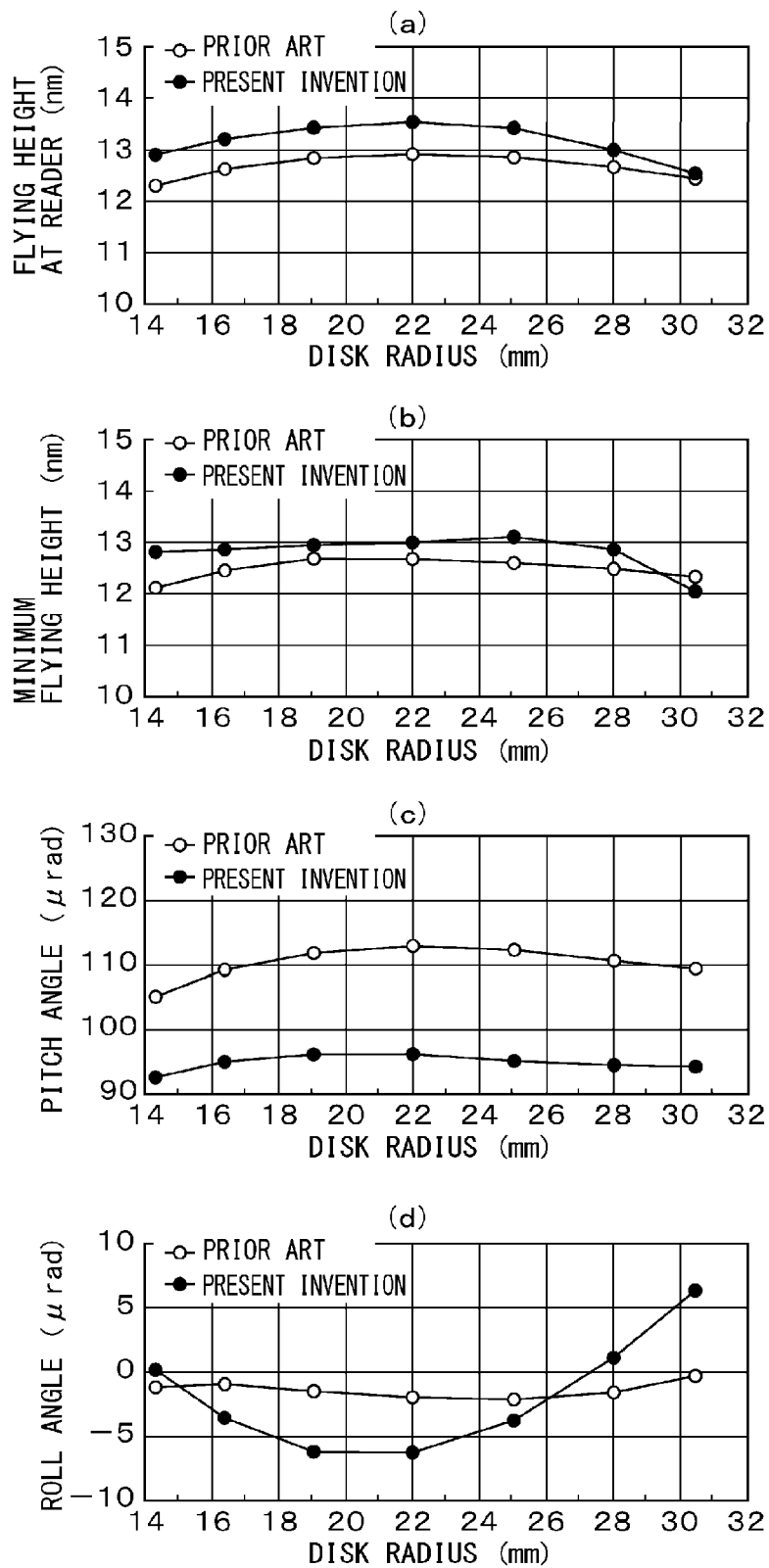

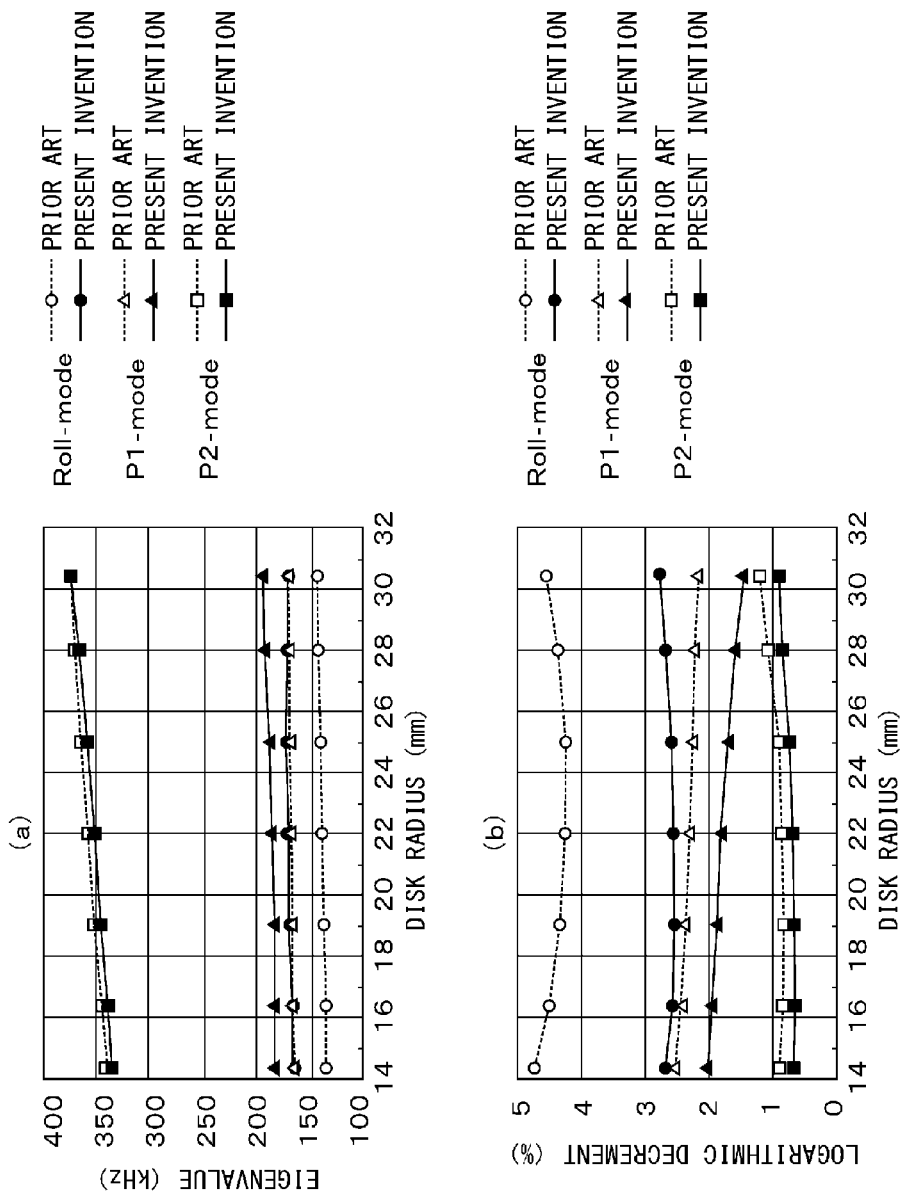

F I G. 1 7
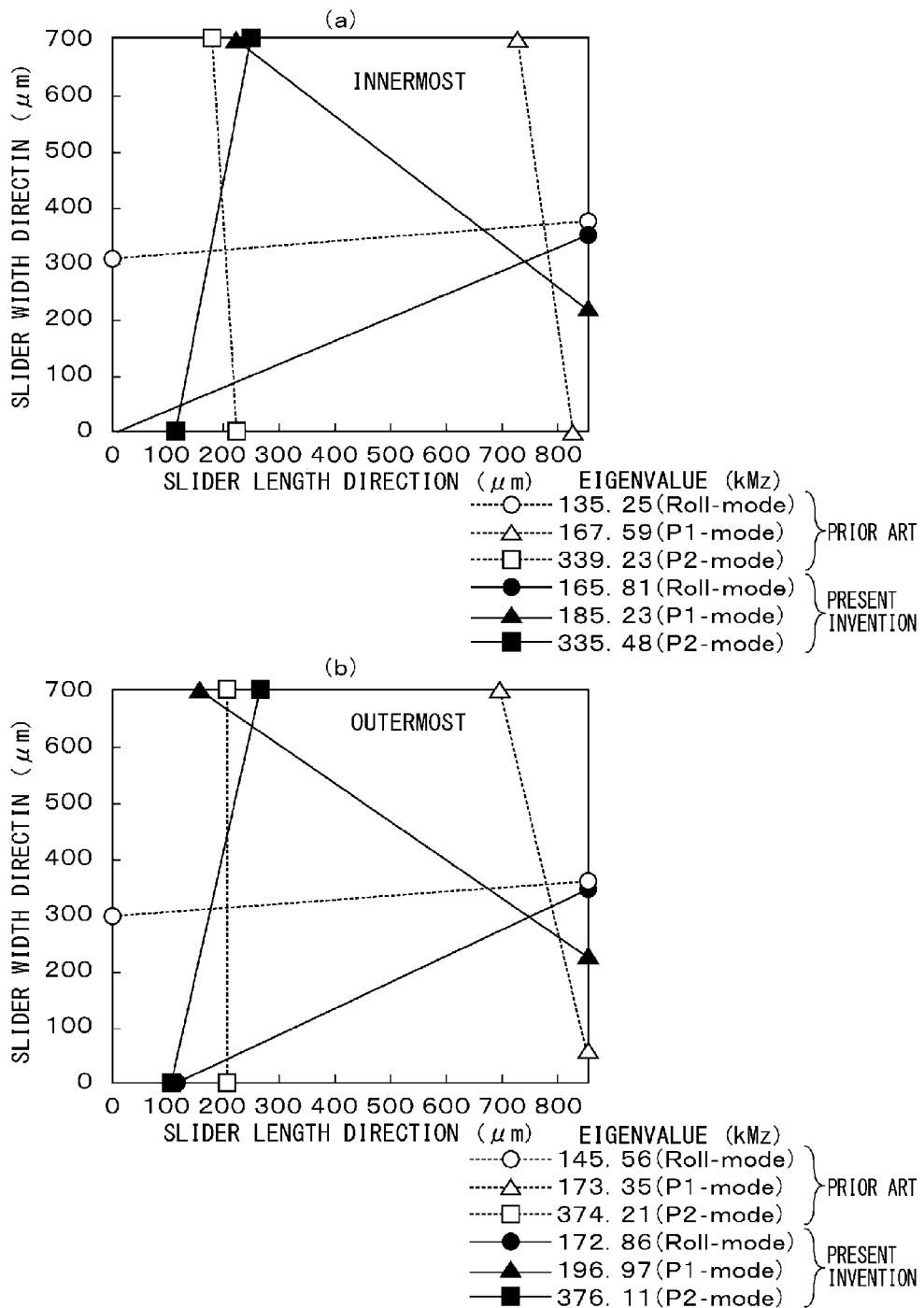

FIG.28
(a)
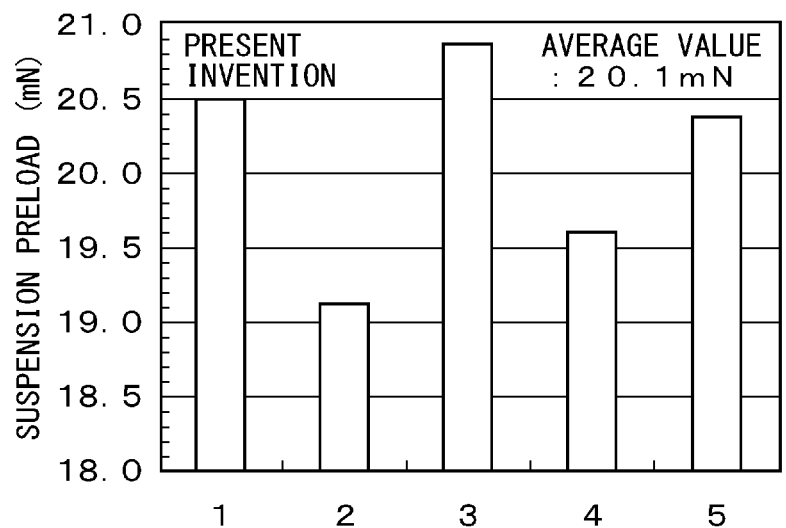
(b)
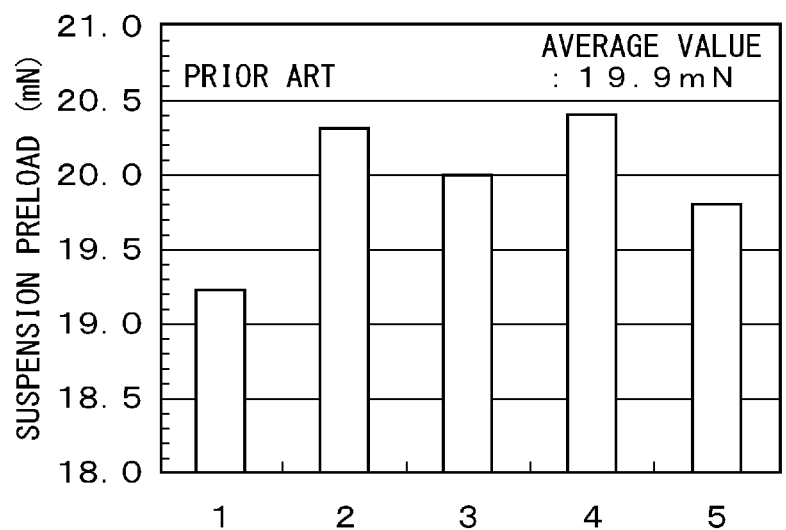

MAGNETIC HEAD SLIDER APPARATUS, MAGNETIC DISK DRIVE APPARATUS, AND SUSPENSION THEREOF

TECHNICAL FIELD

The present invention relates generally to magnetic head sliders and magnetic disk drive apparatuses incorporating the same and, more particularly, to a magnetic head slider apparatus that includes a near field generator for higher recording density and higher reliability and to a magnetic disk drive apparatus incorporating the same.

BACKGROUND ART

Thermal assist recording (TAR) has lately been developed as one of innovative technologies to respond to a need for higher recording density in magnetic disk drives. With the TAR system, a recording medium is locally heated during recording to thereby reduce coercivity of the medium and facilitate recording. The TAR system enables existing single pole write heads to perform recording on media having large coercivity than a recording magnetic field. If a medium has high coercivity, information recorded thereon will not be erased even when the medium is left to stand for a long period of time, so that the medium offers greater thermal stability and responds to the need for higher recording density.

As a prior art arrangement for a magnetic head slider and a suspension thereof relating to the TAR system, an arrangement has been developed as a near field generator in which a submount including a laser diode is mounted on a side surface of the slider. This arrangement includes: a waveguide WG formed between a single pole write head and a magnetoresistive read head as a magnetic head assembly; a near-field transducer disposed on a slider air bearing surface side of the waveguide; and a submount disposed on a side of the slider, the submount including a laser diode (LD) and the like. In this arrangement, the near-field transducer is heated by being irradiated with light generated from the LD and traveling along the waveguide, so that the medium can be locally heated.

Meanwhile, a suspension of a magnetic head slider according to a prior art includes, as disclosed in, for example, patent document 1, a load beam portion, a gimbal portion, and a load protuberance portion. In order to maintain balance between a load from the load beam portion pressing by way of the load protuberance portion and a lifting force and simultaneously achieve steady dynamic flying, the slider is capable of moving with three degrees of freedom in translation, pitch, and roll directions with the load protuberance portion as a pivot.

A magnetic head slider and a suspension thereof according to another prior art includes, as disclosed in, for example, patent document 2, a pivot position control mechanism disposed on one end of a load beam, the pivot position control mechanism including a pivot plate, a first piezo element, and a second piezo element. A pivot formed on the pivot plate abuts against a flexure and end portions of the pivot plate in a track direction and a seek direction respectively abut against end portions of the first and second piezo elements. The position of the pivot abutting against the flexure changes through contraction or expansion of the piezo element to thereby vary a pitch angle or a roll angle. The pivot is positioned at the center of the slider when the piezo element is inactive.

PRIOR ART DOCUMENTS

Patent Documents

Patent Document 1
JP-55-22296-A
Patent Document 2
JP-2007-220227-A

SUMMARY OF THE INVENTION

Problem to be Solved by the Invention

The magnetic head sliders and their suspensions according to the prior arts described above, however, entail a problem, particularly a technical problem involved in putting the abovementioned TAR system to practical use. The problem is that an impact force acting on the slider during operation of the magnetic disk drive can increase the roll angle that represents an attitude angle of the slider during flying in the roll direction, causing the slider to contact a disk even with a low impact force.

A possible cause for this problem is that the slider with the submount including the laser diode mounted on a side surface thereof has a center of mass moved in a slider width direction. This creates an inertia force proportional to a distance between a dimple position at which the impact force acts and the center of mass. It is thus important to minimize the inertia force.

The present invention has been made in view of the foregoing problem of the above-described prior arts and it is an object of the present invention to provide a magnetic head slider apparatus having a structure that includes a submount to permit use of a near field generator for higher recording density and higher reliability, the structure being capable of minimizing a change in a roll angle when an impact force acts on the slider during operation of a magnetic disk drive apparatus and achieving steady flying with the roll angle minimized, and to provide a magnet disk drive apparatus incorporating the same.

Means for Solving the Problem

The above-described object of the present invention is achieved by a magnetic head slider apparatus comprising: a magnetic head slider, the magnetic head slider including: a leading pad formed on a leading side on a first surface of a slider main body, the leading pad contacting a medium surface when a disk is stationary; a trailing pad formed on a trailing side on the first surface of the slider main body, the trailing pad contacting the medium surface when the disk is stationary; a pair of side pads formed on both sides in an airflow direction on the first surface of the slider main body, the side pads contacting the medium surface when the disk is stationary, the leading pad, the trailing pad, and the side pads each having two step surfaces via shoulders extending in a direction of being farther from a contact surface of each pad; a magnetic head; a read/write element; a near-field transducer disposed at a position close to a main magnetic pole of the magnetic head; and a waveguide for guiding external light to the near-field transducer, the magnetic head, the read/write element, the near-field transducer, and the waveguide being disposed inside the magnetic head slider; a submount disposed on a first side surface of the magnetic head slider, the submount including a light-emitting element that emits light for the near-field transducer; and a suspension for supporting the magnetic head slider and the submount integrally at a leading end portion thereof, the suspension including a dimple that applies a load to the magnetic head slider, wherein, letting "w" be a length of the magnetic head slider in a width direction and "yp" be a distance between an end of a side surface of the magnetic head slider and a position of the dimple, the "yp" and the "w" fall within a range that satisfies a condition represented by yp/w<0.5 or yp/w>0.5.

In the magnetic head slider apparatus, letting "S3" and "S4" be areas of the contact surfaces of the side pads, respectively, the "S3" and the "S4" preferably fall within a range that satisfies a condition represented by S3<S4 or S3>S4, or letting "δs3" and "δs4" be depths of first step surfaces relative to the contact surfaces of the side pads, respectively, the "δs3" and the "δs4" preferably fall within a range that satisfies a condition represented by δs3<δs4 or δs3>δs4.

Additionally, the present invention provides a magnetic head slider apparatus comprising: a magnetic head slider, the magnetic head slider including: a leading pad formed on a leading side on a first surface of a slider main body, the leading pad contacting a medium surface when a disk is stationary; a trailing pad formed on a trailing side on the first surface of the slider main body, the trailing pad contacting the medium surface when the disk is stationary; a pair of side pads formed on both sides in an airflow direction on the first surface of the slider main body, the side pads contacting the medium surface when the disk is stationary, the leading pad, the trailing pad, and the side pads each having two step surfaces via shoulders extending in a direction of being farther from a contact surface of each pad; a magnetic head; a read/write element; a near-field transducer disposed at a position close to a main magnetic pole of the magnetic head; and a waveguide for guiding external light to the near-field transducer, the magnetic head, the read/write element, the near-field transducer, and the waveguide being disposed inside the magnetic head slider; a submount disposed on the magnetic head slider, the submount including a light-emitting element that emits light for the near-field transducer; and a suspension for supporting the magnetic head slider and the submount integrally at a leading end portion thereof, the suspension including a dimple that applies a load to the magnetic head slider, wherein the magnetic head slider further comprises a member having mass equivalent to that of the submount, the member and the submount being paired up to be disposed on either side of two mutually opposed side surfaces of the magnetic head slider so that an offset as a difference from a center of mass of the magnetic head slider is zero (0).

In addition, the present invention provides a magnetic disk drive apparatus comprising: a magnetic head slider apparatus; a magnetic recording medium disposed rotatably so as to face a magnetic head slider of the magnetic head slider apparatus; a slider drive unit for driving the magnetic head slider apparatus; a disk drive unit for rotatably driving the magnetic recording medium; and a signal processing circuit for processing read/write signals to be supplied to a magnetic head of the magnetic head slider apparatus, wherein the magnetic head slider apparatus is the magnetic head slider apparatus described above.

Effects of the Invention

The present invention described above achieves, in a magnetic head slider offering higher recording density and higher reliability by having a submount and using a near field generator, good effects of providing a magnetic head slider apparatus having a structure capable of minimizing a change in a roll angle when an impact force acts on the slider during operation of a magnetic disk drive apparatus and achieving steady flying with the roll angle minimized, and providing a magnet disk drive apparatus incorporating the same.

BRIEF DESCRIPTION OF THE DRAWINGS

FIGS. 1(a) and 1(b) are diagrams showing a schematic configuration of a magnetic disk drive apparatus according to a first embodiment of the present invention.

FIG. 2 is a three-dimensional perspective view showing a structure of a magnetic head slider and a suspension thereof in the magnetic disk drive apparatus.

FIGS. 6(a) to 6(c) are partial three-dimensional perspective views showing a more detailed structure of the magnetic head slider according to the first embodiment.

FIGS. 13(a) to 13(d) are graphs showing calculations of the pitch angle, the roll angle, the flying height at reader, and the minimum flying height relative to a disk radius of the magnetic head slider according to the first embodiment.

FIGS. 14(a) and 14(b) are graphs showing calculations of eigenvalue and logarithmic decrement of the magnetic head slider according to the first embodiment relative to the disk radius of the slider.

FIGS. 17(a) and 17(b) are graphs showing calculations of slider pivot shafts when the magnetic head slider according to the first embodiment vibrates at the eigenvalue.

FIGS. 28(*a*) and 28(*b*) are graphs showing measurements of a suspension preload of the magnetic head slider according to the fourth embodiment.

MODES FOR CARRYING OUT THE INVENTION

Figure 3:
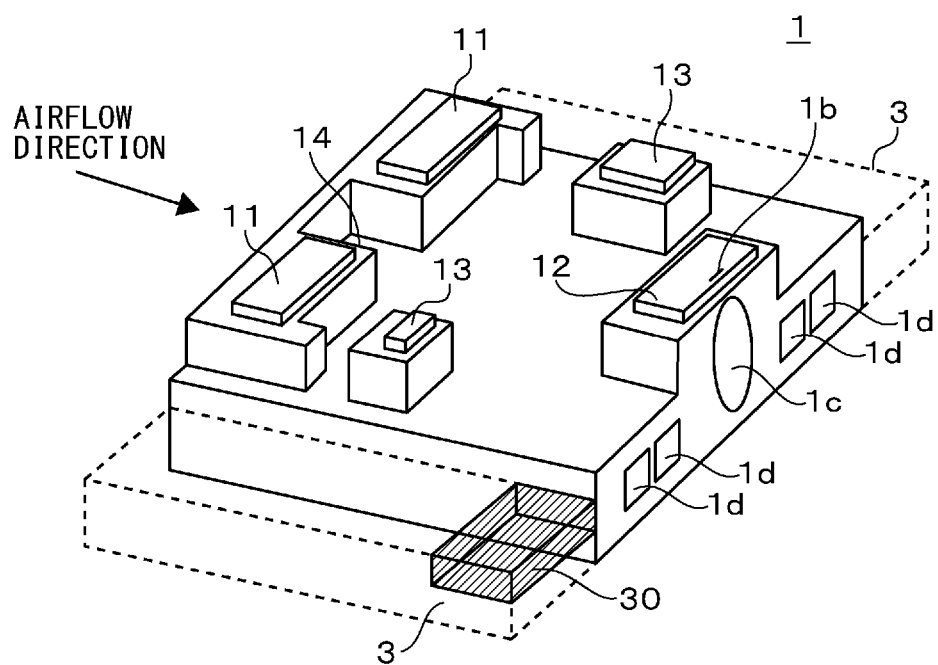
FIG. 3 is a three-dimensional perspective view showing a detailed structure of the magnetic head slider according to the first embodiment.

A magnetic disk drive apparatus according to a first embodiment of the present invention will be described in detail below with reference to accompanying drawings.

First Embodiment

FIGS. 1(*a*) and 1(*b*) show a magnetic disk drive apparatus 5 including a slider according to a first embodiment of the present invention. FIG. 1(*a*), in particular, is a plan view schematically showing a condition in which the slider 1 flies over an upper surface of a magnetic recording medium 53 and performs a seek operation from an outer side to an inner side of a disk. FIG. 1(*b*) is a side elevational view schematically showing the condition. As evident from the figures, the magnetic disk drive apparatus 5 includes the slider 1 and a suspension 2 thereof to which the present invention is applied, the magnetic recording medium 53 and a drive unit 56 that drives the magnetic recording medium 53, a positioning suspension arm 58 and a drive unit 59 that drives the suspension arm 58, a signal processing circuit 99 that processes read/write signals of magnetic heads mounted on the slider 1, and the like. It is noted that the slider 1 and the suspension 2 each fly over a corresponding upper or lower surface of the magnetic recording medium 53.

FIG. 2 is a three-dimensional perspective view showing the slider 1 and the suspension 2 thereof to which the present invention is especially applied in the components constituting the above-described magnetic disk drive apparatus. As evident from this figure, the suspension 2 includes a load beam portion 21 and a gimbal portion 22 attached to a lower surface of the load beam portion 21. The suspension 2 further includes a dimple 23 as, what is called, a load protuberance portion, near an opening at a leading end of the load beam portion 21. In addition, the slider 1 that incorporates a near field generator to be described in detail later is disposed at a leading end of the gimbal portion 22.

FIG. 3 is a three-dimensional perspective view showing the magnetic head slider 1 according to the first embodiment of the present invention. Specifically, the slider 1 includes a pair of pads 11, a negative-pressure pocket portion 14, a pad 12, and a pair of pads 13, formed on an obverse surface of the slider 1 facing the magnetic recording medium 53. The pads 11 (hereinafter referred to also as "leading pads") are formed on a leading side and can assume air bearing surfaces. The negative-pressure pocket portion 14 is surrounded by the pads 11. The pad 12 (also referred to as a "trailing pad") is formed on a trailing side and can assume an air bearing surface. The pads 13 (also referred to as "side pads") are formed on both sides in an airflow direction and can assume air bearing surfaces. A minute stepped air bearing surface that can assume an air bearing surface is formed on each pad surface. The slider 1 further includes a read/write element 1*b* disposed at a trailing end of the trailing pad 12. The read/write element 1*b* includes a near-field transducer, a main magnetic pole write head, and an exposed portion of a magnetoresistive read element. In addition, a magnetic head 1*c*, connection terminals 1*d*, and the like are disposed on a trailing end face of the slider 1. Additionally, as shown by the broken line in the figure, a submount 3 including an end face emission type laser diode 30 is disposed as a near field generator on a side surface of the slider 1. The laser diode 30 has a length in a longitudinal direction substantially equal to a length of the submount 3 in a transverse direction.

Figure 4:
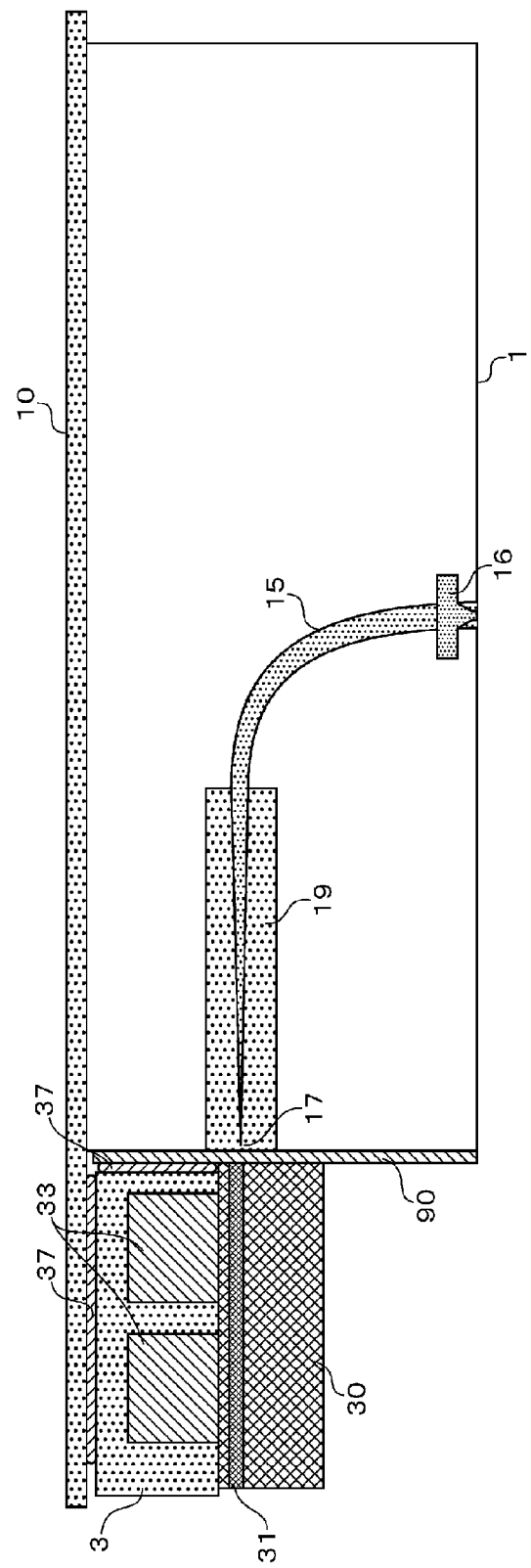
FIG. 4 is a three-dimensional perspective view showing a detailed structure of the magnetic head slider and a submount disposed on a side surface thereof according to the first embodiment.

FIG. 4 shows a cross section that illustrates an exemplary structure of the magnetic head slider 1 including the submount 3. In this figure, the magnetic head slider 1 and the submount 3 are mounted on a surface of a flexure 10 of the suspension. The laser diode 30 is formed on the submount 3. Laser light emitted from the laser diode 30 passes through a waveguide core 15 formed in the slider 1 and is guided to a metal structural member that assumes a near-field transducer 16 disposed near the main magnetic pole piece of the magnetic head and close to the surface of the slider 1. As a result, at the very moment of writing, the magnetic recording medium 53 is heated by the near-field light generated by the near-field transducer 16 and, at the same time, a recording magnetic field generated from the main magnetic pole piece is applied to the magnetic recording medium 53, thereby a recording mark being written in a recording layer of the magnetic recording medium 53. Reference numeral 31, 33, and 37 in this figure denote an active layer, an electrode, and a conductive adhesive, respectively. Additionally, reference numeral 90 in the figure denotes an antireflection layer, and reference numerals 17 and 19 in the figure denote a waveguide inlet and a spot-size converter, respectively.

Specifically, the slider 1 is, what is called, a step slider using negative pressure in which negative pressure Q2 is generated in the negative-pressure pocket portion 14 surrounded by the two leading pads 11 and the side pads 13 at which positive pressure Q1 is aerodynamically generated. The positive pressure Q1 is generated because a volume in the negative-pressure pocket portion 14 increases sharply when the disk spins and air flows between the slider and the disk. Additionally, the positive pressure Q1 acts in a direction in which a flying height increases, while the negative pressure Q2 acts in a direction in which the flying height decreases.

Figure 5:
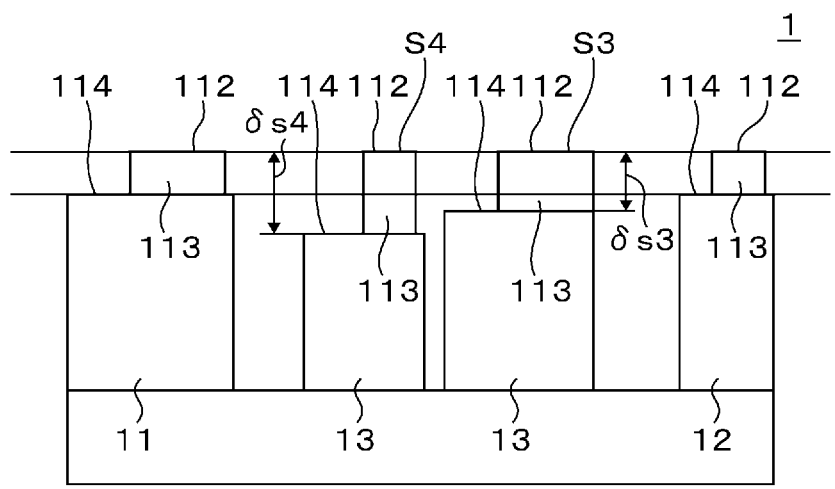
FIG. 5 is a side elevational view showing the detailed structure of the magnetic head slider according to the first embodiment.

The above will be described in greater detail with reference to FIGS. 5 and 6(*a*) to 6(*c*). FIG. 5 is a side elevational view showing the magnetic head slider according to the first embodiment. FIGS. 6(a) to 6(c) are partial perspective views, showing specifically the leading pads 11, the trailing pad 12, and the side pads 13, respectively.

As shown in these figures, the leading pads 11, the trailing pad 12, and the side pads 13 are each formed to have, what is called, two step surfaces comprising a pad surface 112 (also referred to as a "contact surface") that contacts the medium surface when the disk is stationary, a first step surface 114 (a shallow groove surface) disposed on the leading side, and a second step surface 116 (a deep groove surface) disposed via shoulders 113 and 115. Specifically, in FIG. 5, "δs3" and "δs4" represent depths of the first step surfaces 114 (shallow groove surface) relative to the contact surfaces 112 of the side pads 13 formed on both sides, respectively. Additionally, "S3" and "S4" in these figures represent areas of the contact surfaces 112 of the side pads 13 formed on both sides, respectively.

The known dynamic gas pressure bearing theory is applied to the magnetic head slider 1 incorporated in the magnetic disk drive apparatus 5. The step slider using negative pressure, particularly, is formed to include five pads: specifically, the pair of leading pads 11 formed on the leading side, the trailing pad 12 formed on the trailing side, and the pair of side pads 13 formed on both sides. Each pad surface includes a minute stepped air bearing surface that can assume an air bearing surface as the minute stepped air bearing surface holds back air drawn in through the spinning of the surface of the magnetic recording medium 53. Then, reaction thereto causes a positive-pressure peak that serves aerodynamically as a lifting force to occur in each of the five pads at areas near trailing ends of the leading pads, a trailing end of the trailing pad, and trailing ends of the side pads. The five positive-pressure peaks hold the magnetic head slider 1 in place to allow the slider 1 to fly steadily over the magnetic recording medium 53 with a minimal and constant distance maintained therebetween. Thus, the positive-pressure lifting force generated on each stepped air bearing surface can be greater by reducing a clearance between the contact surface 112 and the magnetic recording medium 53, increasing the depth of step surface 114 relative to the contact surface 112, and enlarging the area of the contact surface 112.

In the magnetic head slider according to the first embodiment of the present invention, the abovementioned areas are set so that the condition of S3<S4 or S3>S4 is satisfied. Such an arrangement of having a big difference in area between the contact surfaces 112 of the side pads 13 formed on both sides increases a difference in positive-pressure lifting force between the two side pads formed on both sides, so that a pressure center position of the lifting force of the slider 1 and the dimple position moved in the slider width direction can be aligned with each other on a straight line.

Figure 7:
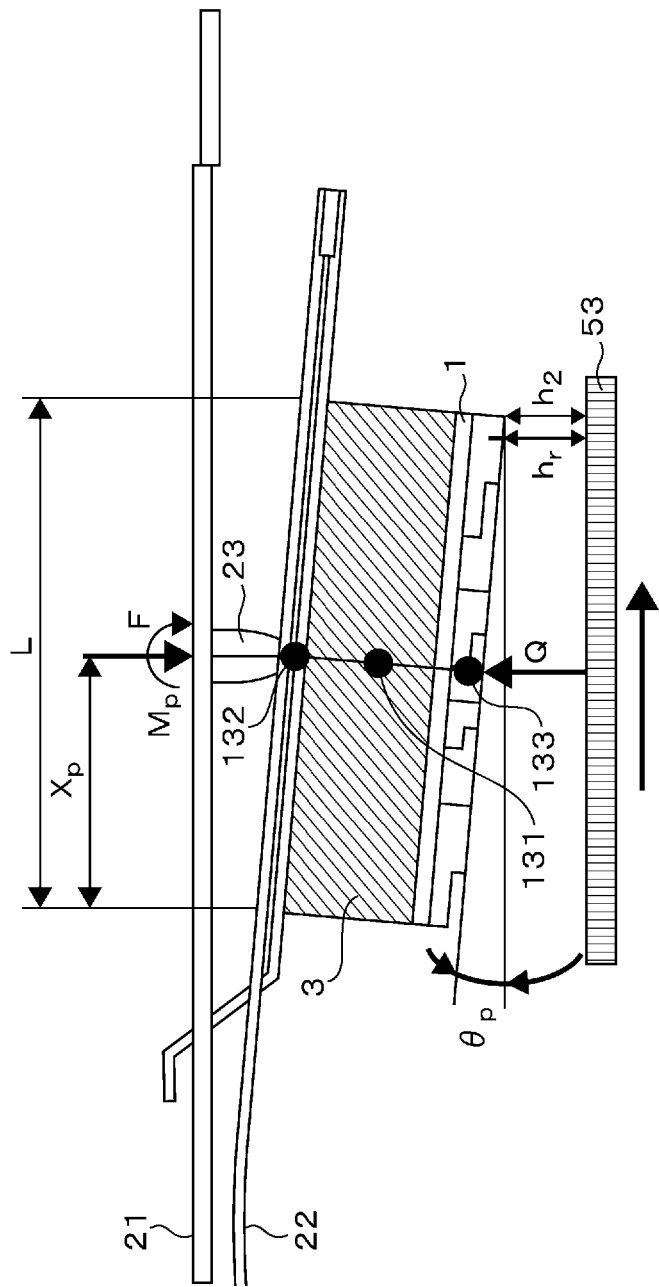
FIG. 7 is a side elevational view showing the magnetic head slider according to the first embodiment during its flying, viewed from a pitch direction (a longitudinal direction of the slider).

FIG. 7 is a side elevational view showing a condition in which the magnetic head slider, on which the submount 3 including the laser diode is mounted, according to the first embodiment of the present invention, flies over the surface of the magnetic recording medium 53, as viewed from a pitch direction (in a longitudinal direction of the slider).

Figure 8:
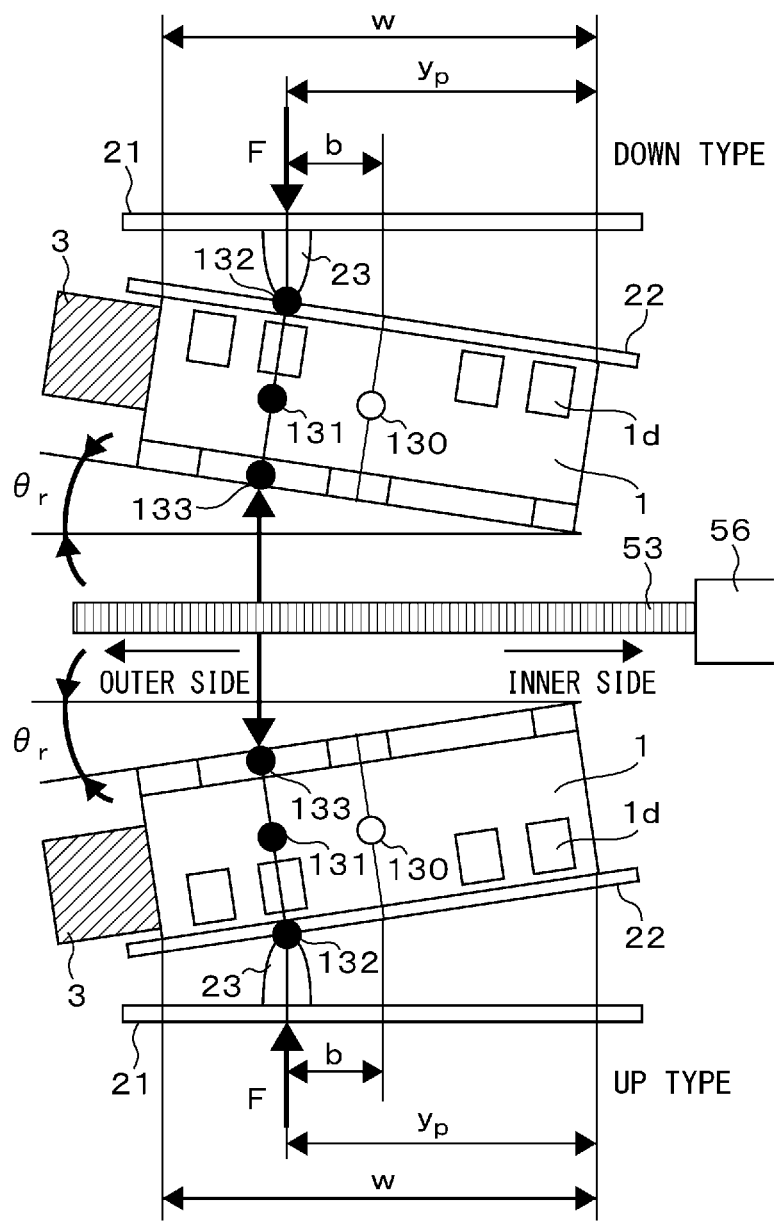
FIG. 8 is a side elevational view showing the magnetic head slider according to the first embodiment during its flying, viewed from a roll direction (a seek direction).

FIG. 8 shows a condition in which the magnetic head sliders, on which the submounts 3 including the laser diodes are mounted, according to the first embodiment of the present invention, fly over the surface of, and across, the magnetic recording medium 53, as viewed with the trailing side end face on which the connection terminals 1d are disposed at the front, specifically, as viewed from a roll direction (a seek direction). The upper slider 1 is called a "down type", while the lower slider 1 is called an "up type". Additionally, the slider 1 has two side surfaces, one disposed on an "inner side" and the other disposed on an "outer side". Thus, FIG. 8 is a side elevational view showing a condition in which the submount 3 including the laser diode is mounted on the side surface on the "outer side" of the slider 1.

Figure 9:
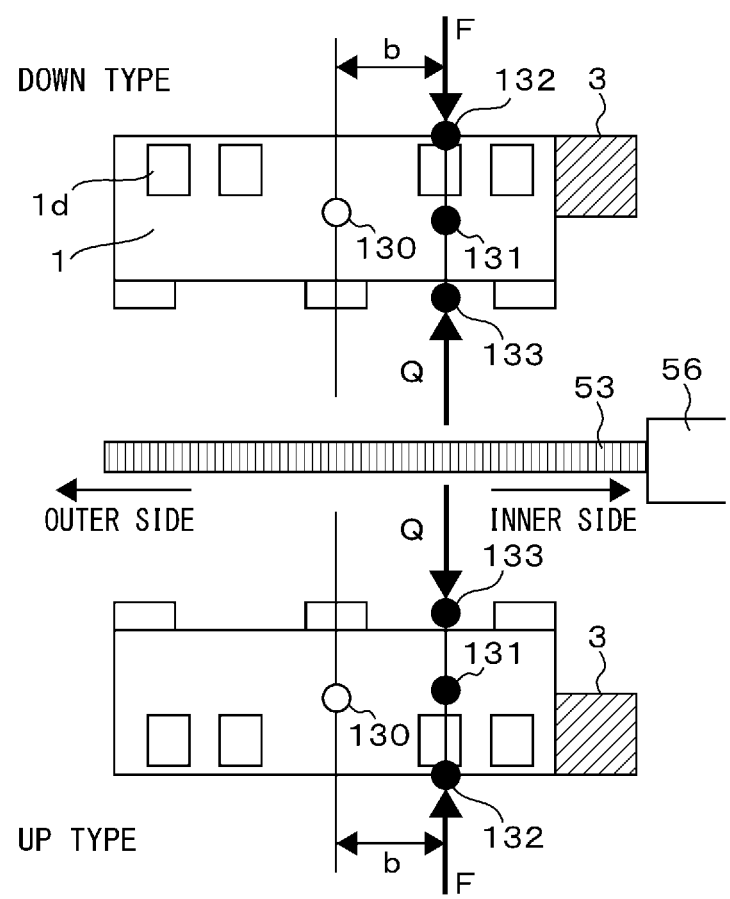
FIG. 9 is a diagram showing a condition in which the submount is mounted on a side surface of the magnetic head slider according to the first embodiment.

FIG. 9 is a diagram showing a condition in which the submount 3 including the laser diode is mounted on the side surface on the "inner side" of the slider 1.

In these figures, the dimple 23 is provided as a load acting point at which a load F pressed by the load beam portion 21 acts on the slider. In addition, the dimple 23 allows a resilience to act on movements of the slider with three degrees of freedom in translation (vertical), pitch (longitudinal), and roll (seek) directions with the dimple 23 as a pivot.

The position (Xp, Yp) of the dimple 23 as the load acting point is expressed as nondimensional values, such as Xp=xp/L in the pitch direction and Yp=yp/w in the roll direction. However, "xp" is a distance from the leading end of the slider, "yp" is a distance from an end of the side surface on the inner side of the slider 1, "L" is a longitudinal length of the slider, and "w" is a transverse length (width) of the slider.

The slider 1 dynamically and steadily flies in a condition in which the suspension preload F and a lifting force Q (=Q1−Q2) as a resultant force of the positive pressure Q1 and the negative pressure Q2 (>0) generated aerodynamically achieve equilibrium at the position of the dimple 23 through a relational expression of F=Q and with a pitch angle "θp" representing a flying attitude in the pitch direction, a roll angle "θr" representing a flying attitude in the roll direction, a trailing end flying height "h2", and a flying height "hr" at the read/write element 1b maintained constant. In the figure, "Mp" denotes an initial pitching moment acting around the dimple position. It is noted that an apex of the roll angle "θr" representing the flying attitude in the roll direction defines an end of a side surface of the slider 1 on the inner side and the clockwise direction is positive.

A center of mass 131 of the slider having the submount including the laser diode mounted on the inner side surface thereof moves in the slider width direction or toward the submount from a center of mass 130 of the slider as a single component with its offset amount being denoted "b". The offset amount "b" is positive when the center of mass 131 is offset toward the side surface of the slider 1 on the outer side. In FIG. 9, the center of mass 131 is offset toward the side surface of the slider 1 on the inner side and the offset "b" is thus negative. A material, for example, aluminum nitride or silicon having a high thermal conductivity, is used for the submount in consideration of heat generated by the laser diode. The offset amount "b" may be determined by finding the center of mass of the slider having the submount including the laser diode mounted thereon and the center of mass of the slider as a single component and calculating a difference in the slider width direction between the two. The offset amount "b" depends on mass, materials, and shapes of the laser diode and the submount. For example, if gallium arsenide and aluminum nitride are used for the laser diode and the submount, respectively, and the mass and width of the submount including the laser diode are 0.179 mg and 500 μm, respectively, then "b"=0.138 mm. The larger the mass and size of the submount including the laser diode are, the greater the offset amount "b" is. The shape of the submount can be easily determined by finding relational expressions for these.

Additionally, a position 132 of the dimple 23 as the load acting point, the pressure center position of the lifting force of the slider 1, and the center of mass 131 of the slider having the submount including the laser diode mounted on the inner side surface thereof are aligned with each other on a straight line.

The magnetic head slider according to the first embodiment of the present invention is arranged so that the difference in area between the contact surfaces 112 of the side pads 13 formed on both sides is large. This increases a difference in positive-pressure lifting force between the two side pads formed on both sides, so that the pressure center position of the lifting force of the slider 1 and the dimple position moved in the slider width direction can be aligned with each other on a straight line.

Specifically, through the foregoing arrangements, when an impact force acts, during operation of the magnetic disk drive apparatus, on the position 132 of the dimple 23 of the slider 1 having the submount 3 including the laser diode mounted thereon, the inertia force proportional to the distance between the center of mass 131 of the slider having the submount 3 including the laser diode mounted thereon and the position 132 of the dimple 23 can be made small. This prevents the roll angle from becoming large and there is no chance of contact with the disk even with a large impact force, moreover, allowing flying with a small roll angle.

Figure 10:
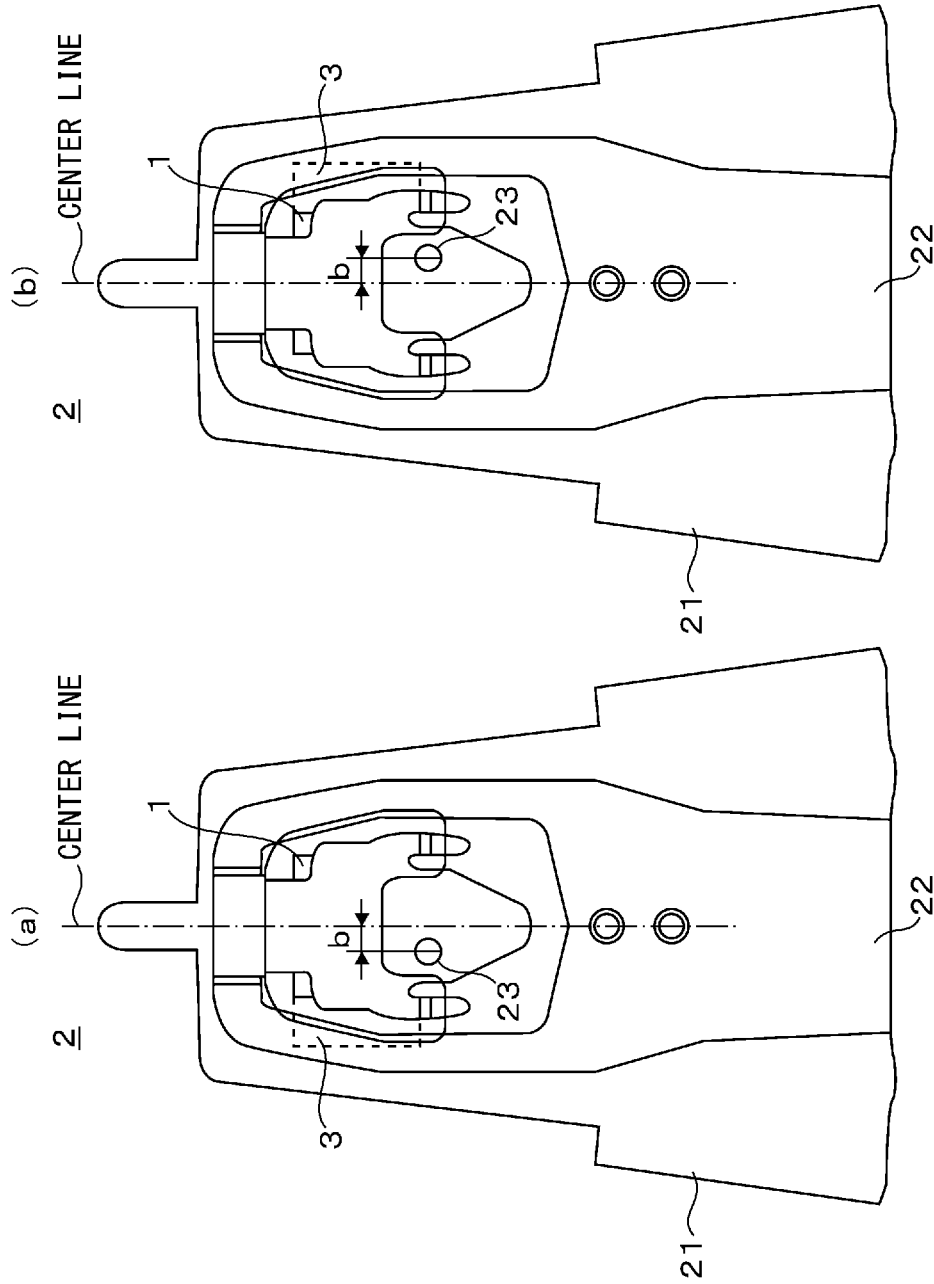
FIGS. 10(a) and 10(b) are plan views showing a suspension of the magnetic head slider according to the first embodiment.

FIGS. 10(a) and 10(b) are plan views showing the suspension of the magnetic head slider according to the first embodiment of the present invention. The suspension 2 includes, for example, the load beam portion 21, the gimbal portion 22, and the load protuberance portion (also called the "dimple") 23. FIG. 10(a), particularly, shows the suspension offset toward the inner side surface of the slider 1, representing the suspension 2 for use with the slider having the submount 3 including the laser diode mounted on the inner side surface thereof. Alternatively, FIG. 10(b) shows the suspension offset toward the outer side surface of the slider 1, representing the suspension 2 for use with the slider having the submount 3 including the laser diode mounted on the outer side surface thereof.

Figure 11:
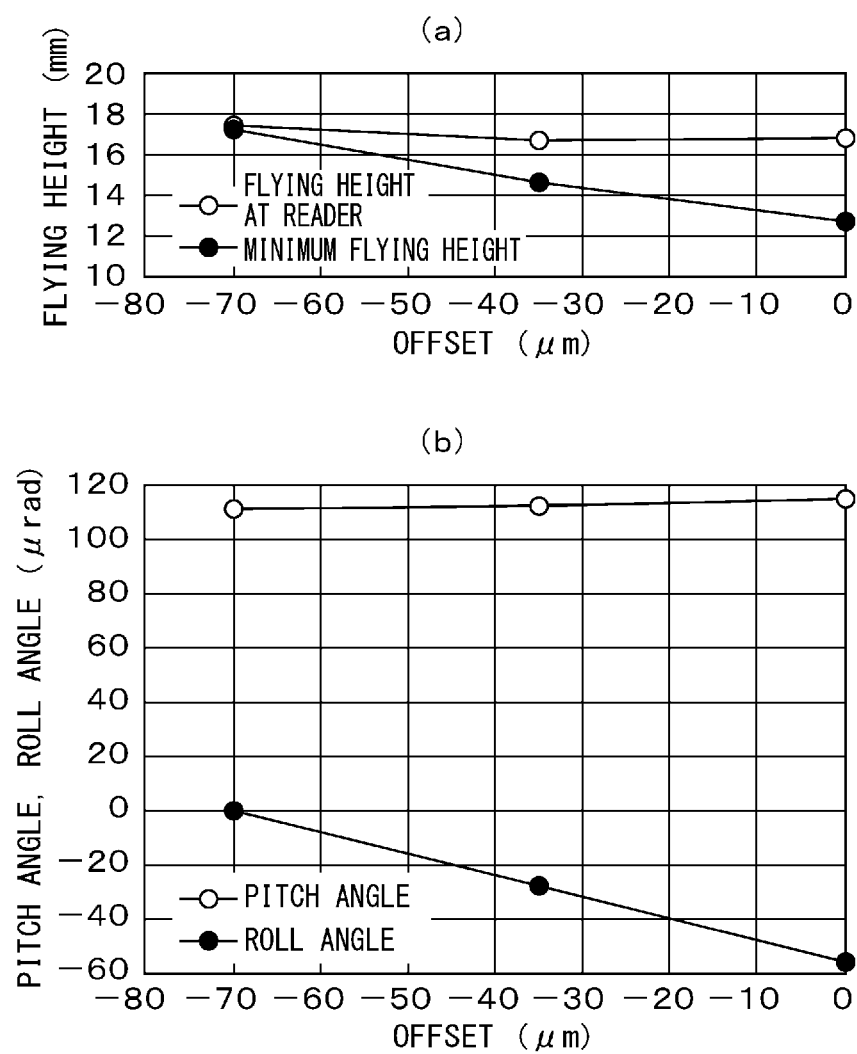
FIGS. 11(a) and 11(b) are graphs showing calculations of a pitch angle, a roll angle, a flying height at reader, and a minimum flying height relative to an offset of the magnetic head slider according to the first embodiment.

FIGS. 11(a) and 11(b) show calculations of a flying height at reader, a minimum flying height, a pitch angle, and a roll angle when the offset is changed to 0 (dimple position Yp=0.50), −35 μm (dimple position Yp=0.40), and −70 μm (dimple position Yp=0.39) under constant conditions of an altitude of 0 m, a speed of 5400 rpm, and a disk radius (medium condition for a 2.5" apparatus), using air bearing surface shapes rendering 0.0313 mm$^2$ for the area "S4" of the contact surface 112 of the side pad on the inner side, 0.00721 mm$^2$ for the area "S3" of the contact surface 112 of the side pad on the outer side, 0.18 μm for "δs3", and 0.18 μm for "δs4" in the magnetic head slider according to the first embodiment of the present invention. The figures reveal that, as the offset increases, the roll angle becomes substantially zero (0) and the minimum flying height increases, with the flying height at reader and the pitch angle substantially remaining unchanged. It is noted that the suspension preload "F" is 20.9 mN and the dimple position "Xp" is 0.5. In addition, the area "S4" of the contact surface 112 of the side pad on the inner side in the down type slider having the submount including the laser diode mounted on the inner side surface thereof is set to be larger than the area "S3" of the contact surface 112 of the side pad on the outer side.

Figure 12:
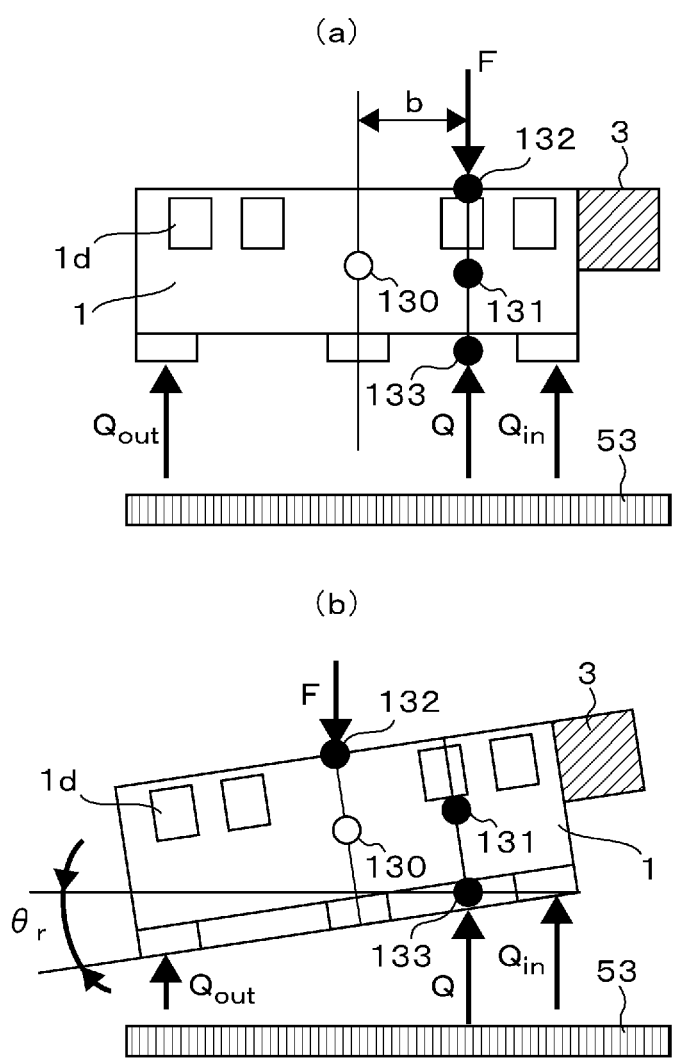
FIGS. 12(a) and 12(b) are diagrams illustrating effects of the magnetic head slider according to the first embodiment.

FIGS. 12(a) and 12(b) illustrate, using the calculations of FIGS. 11(a) and 11(b), how effects are achieved by the magnetic head slider according to the first embodiment of the present invention. If the area "S4" of the contact surface 112 of the side pad on the inner side of the slider is set to be larger than the area "S3" of the contact surface 112 of the side pad on the outer side, the slider flies with the roll angle of a large value such as −56.0 μrad when the offset is zero and with the roll angle of −6.3 μrad which is almost zero (0) when the offset is −70 μm.

As described above, the arrangement having a large difference in area between the contact surfaces 112 of the side pads 13 formed on both sides in the slider 1 according to the first embodiment of the present invention causes a large difference between a positive-pressure lifting force "Qin" of the side pad on the inner side and a positive-pressure lifting force "Qout" of the side pad on the outer side, thus allowing the pressure center position of the lifting force of the slider 1 and the dimple position moved in the slider width direction to be aligned with each other on a straight line.

Additionally, FIGS. 13(a) to 13(d) show calculations of the flying height at reader, the minimum flying height, the pitch angle, and the roll angle when the disk radius changes from the innermost circumference to the outermost circumference of a 2.5" apparatus, under constant conditions of an altitude of 0 m and a speed of 5400 rpm, using air bearing surface shapes rendering 0.0313 mm$^2$ for the area "S4" of the contact surface 112 of the side pad on the inner side, 0.00721 mm$^2$ for the area "S3" of the contact surface 112 of the side pad on the outer side, 0.18 μm for "δs3", and 0.18 μm for "δs4" in the magnetic head slider according to the first embodiment of the present invention and using the prior art slider. The figures reveal that the flying height at reader, the minimum flying height, the pitch angle, and the roll angle of the slider 1 according to the first embodiment of the present invention with changes from the innermost circumference to the outermost circumference remain constant substantially identically to the prior art slider.

FIGS. 14(a) and 14(b) show calculations of eigenvalue and logarithmic decrement of the slider when the disk radius changes from the innermost circumference to the outermost circumference of a 2.5" apparatus, under constant conditions of an altitude of 0 m and a speed of 5400 rpm, using air bearing surface shapes rendering 0.0175 mm$^2$ for the area "S4" of the contact surface 112 of the side pad on the inner side, 0.00721 mm$^2$ for the area "S3" of the contact surface 112 of the side pad on the outer side, 0.18 μm for "δs3", and 0.18 μm for "δs4" in the magnetic head slider according to the first embodiment of the present invention and using the prior art slider. The figures reveal that the eigenvalue and the logarithmic decrement of the slider 1 according to the first embodiment of the present invention with changes from the innermost circumference to the outermost circumference increase and decrease, respectively, relative to the slider 1 of the prior art. The logarithmic decrement of the air bearing surface of the first embodiment of the present invention indeed decreases, but corresponding values are not particularly poor and can be improved by other methods.

Figure 15:
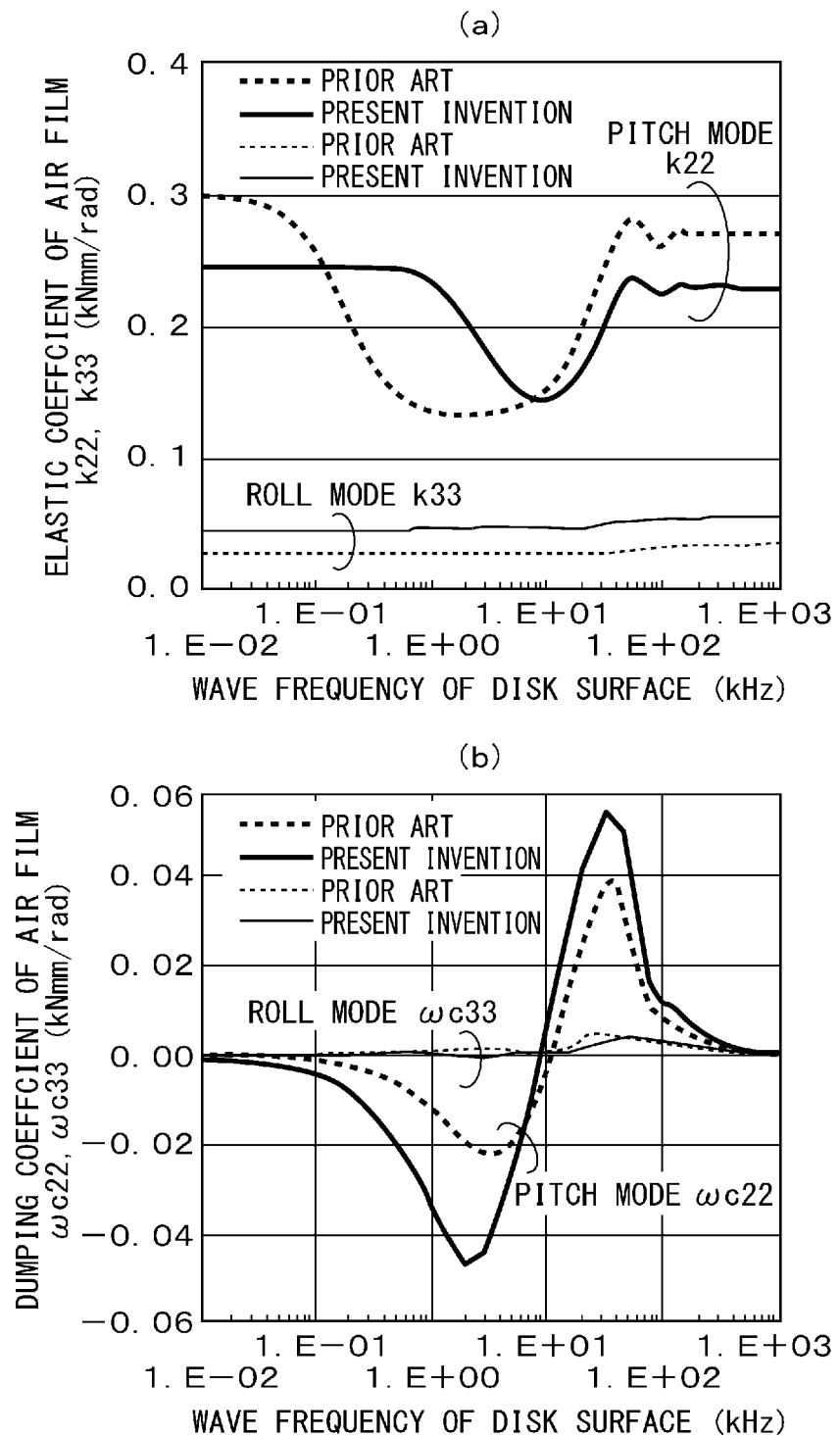
FIGS. 15(a) and 15(b) are graphs showing calculations of elastic coefficient and a damping coefficient of an air film relative to wave frequencies of disk surface of the magnetic head slider according to the first embodiment.

FIGS. 15(a) and 15(b) show calculations of elastic coefficient and a damping coefficient of an air film in a pitch mode and a roll mode relative to wave frequencies of disk surface when the slider flies over disk waviness under constant conditions of an altitude of 0 m, a speed of 5400 rpm, and a disk radius (medium condition for a 2.5" apparatus), using air bearing surface shapes rendering 0.0175 mm$^2$ for the area "S4" of the contact surface 112 of the side pad on the inner side, 0.00721 mm$^2$ for the area "S3" of the contact surface 112 of the side pad on the outer side, 0.18 μm for "δs3", and 0.18 μm for "δs4" in the magnetic head slider according to the first embodiment of the present invention and using the prior art slider. The figures reveal that the elastic coefficient of the air film in the pitch mode and the roll mode relative to the wave frequencies of disk surface of the slider 1 according to the first embodiment of the present invention decreases and increases, respectively, relative to the slider 1 of the prior art. The air film elastic coefficient increases in the roll mode because of the increased positive pressure as a result of the greater air bearing surface. The damping coefficient, though it decreases, does not suggest a particularly poor value.

Figure 16:
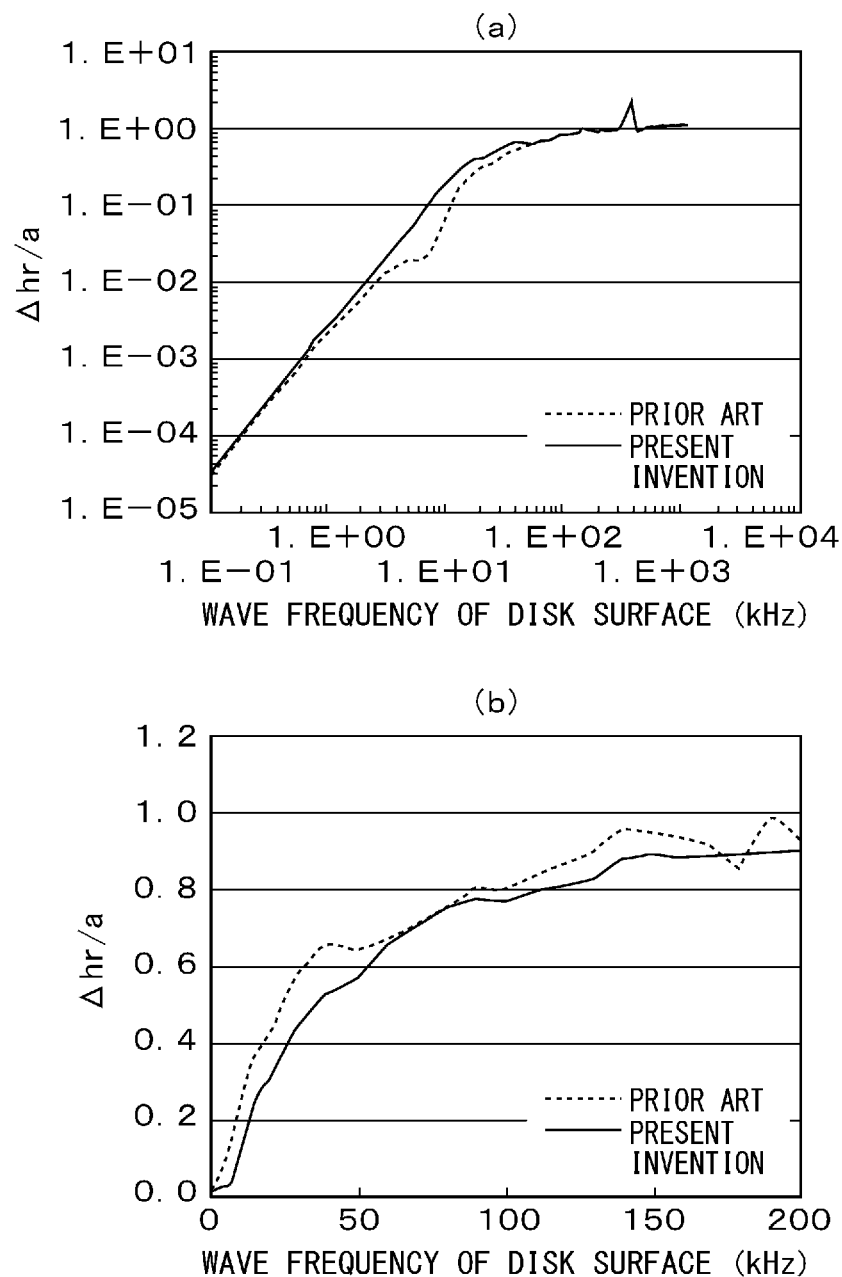
FIGS. 16(a) and 16(b) are graphs showing calculations of a ratio of flying height at reader fluctuations at reader to a disk waviness amplitude relative to the wave frequencies of disk surface of the magnetic head slider according to the first embodiment.

FIGS. 16(a) and 16(b) show calculations of flying height fluctuations at reader "Δhr" relative to wave frequencies of disk surface, represented by a ratio of the fluctuations "Δhr" to a disk waviness amplitude "a", when the slider flies over disk waviness under constant conditions of an altitude of 0 m, a speed of 5400 rpm, and a disk radius (medium condition for a 2.5" apparatus), using air bearing surface shapes rendering 0.0175 mm² for the area "S4" of the contact surface 112 of the side pad on the inner side, 0.00721 mm² for the area "S3" of the contact surface 112 of the side pad on the outer side, 0.18 μm for "δs3", and 0.18 μm for "δs4" in the magnetic head slider according to the first embodiment of the present invention and using the prior art slider. The figures reveal that the flying height fluctuations at reader relative to the wave frequencies of disk surface of the slider 1 according to the first embodiment of the present invention, though they do increase relative to the slider 1 of the prior art, do not suggest a particularly poor value that can be improved by other methods. It is thus known that runout in a low frequency range of disk waviness frequencies up to 3 kHz and the flying height fluctuations at reader relative to micro-waviness in a high frequency range of disk waviness frequencies from 10 kHz to 200 kHz of the slider 1 according to the first embodiment of the present invention are substantially equal to those of the slider of the prior art.

FIGS. 17(a) and 17(b) show calculations of slider pivot shafts in a primary pitch mode (P1 mode), a secondary pitch mode (P2 mode), and the roll mode when the slider vibrates at the eigenvalue, under constant conditions of an altitude of 0 m, a speed of 5400 rpm, and a disk radius on the innermost circumference and the outermost circumference of a 2.5" apparatus, using air bearing surface shapes rendering 0.0175 mm² for the area "S4" of the contact surface 112 of the side pad on the inner side, 0.00721 mm² for the area "S3" of the contact surface 112 of the side pad on the outer side, 0.18 μm for "δs3", and 0.18 μm for "δs4" in the magnetic head slider according to the first embodiment of the present invention and using the prior art slider. The figures reveal that, in both the innermost and outermost circumference conditions, the pivot shaft in the roll mode of the slider 1 according to the first embodiment of the present invention changes more compared with the slider 1 of the prior art; there is, however, only a small change in the read/write element position at the trailing end. Therefore, fluctuations in the flying height at reader are not very large as with the results shown in FIGS. 16(a) and 16(b).

Figure 18:
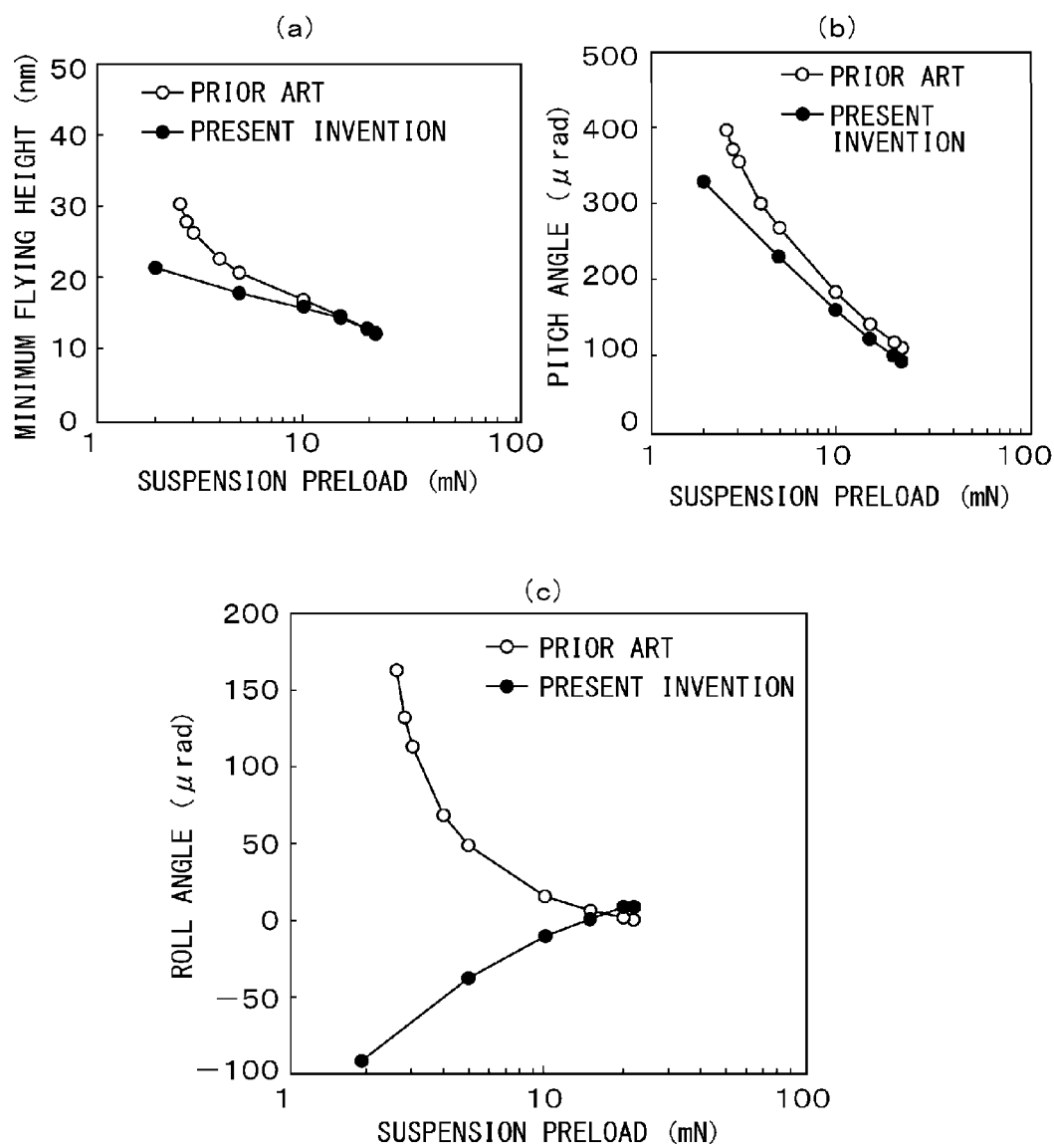
FIGS. 18(a) to 18(c) are graphs showing calculations of the pitch angle, the roll angle, and the minimum flying height when the magnetic head slider according to the first embodiment is unloaded.

FIGS. 18(a) to 18(c) show calculations of the pitch angle, the roll angle, and the minimum flying height when the slider is unloaded, under constant conditions of an altitude of 0 m, a speed of 5400 rpm, and a disk radius on the outermost circumference of a 2.5" apparatus, using air bearing surface shapes rendering 0.0175 mm² for the area "S4" of the contact surface 112 of the side pad on the inner side, 0.00721 mm² for the area "S3" of the contact surface 112 of the side pad on the outer side, 0.18 μm for "δs3", and 0.18 μm for "δs4" in the magnetic head slider according to the first embodiment of the present invention and using the prior art slider. The suspension preload is small when the slider is unloaded so that the pitch angle, the roll angle, and the minimum flying height are taken as a model for a change in the suspension preload. The figures reveal that the pitch angle, the roll angle, and the minimum flying height are substantially equal to those of the slider 1 of the prior art when the suspension preload of the slider 1 decreases according to the first embodiment of the present invention. Thus, slider behavior during unloading is not particularly poor.

Second Embodiment

A slider according to a second embodiment of the present invention, and a magnetic disk drive apparatus having the same will be described in detail below.

Figure 19:
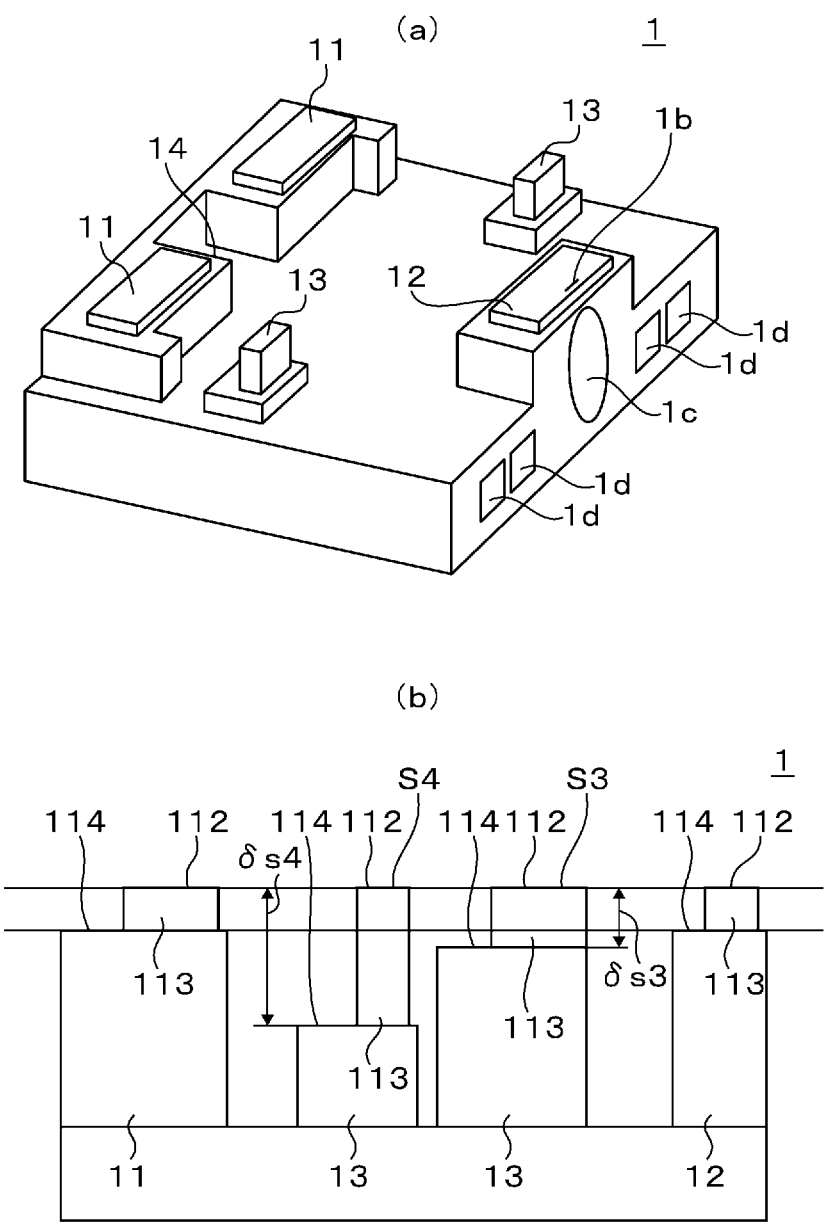
FIGS. 19(*a*) and 19(*b*) are a three-dimensional perspective view and a side elevational view, respectively, showing a magnetic head slider according to a second embodiment of the present invention.

FIGS. 19(a) and 19(b) are a three-dimensional perspective view and a side elevational view, respectively, showing the magnetic head slider 1 according to the second embodiment of the present invention. Specifically, as shown in FIG. 19(a), the slider 1 includes a pair of leading pads 11, a trailing pad 12, and a pair of side pads 13. The leading pads 11 are formed on a leading side and can assume air bearing surfaces. The trailing pad 12 is formed on a trailing side and can assume an air bearing surface. The side pads 13 are formed on both sides and can assume air bearing surfaces. In addition, "δs3" and "δs4" indicated in FIG. 19(b) represent depths of step surfaces 114 (shallow groove surfaces) relative to contact surfaces 112 of the side pads 13 formed on both sides in the airflow direction, respectively.

In addition, in the embodiment, the difference between the shallow groove depths "δs3" and "δs4" of the side pads 13 is made even greater. Specifically, the arrangement in the magnetic head slider according to the first embodiment of the present invention described earlier has a large difference in area between the contact surfaces 112, though the condition of δs3<δs4 or δs3>δs4 is satisfied. The arrangement, in which the difference between the shallow groove depths of the side pads 13 formed on both sides in the airflow direction is made even greater, also increases a difference in positive-pressure lifting force between the two side pads formed on both sides as in the second embodiment. This allows the center of pressure position of the lifting force of the slider 1 and the dimple position moved in the slider width direction to be aligned with each other on a straight line so that both the positions are identical. Additionally, a position 132 of a dimple 23 as the load acting point, the pressure center position of the lifting force of the slider 1, and a center of mass 131 of the slider having a submount including a laser diode mounted on the inner side surface thereof are arranged on a straight line so as to fall in an identical position.

In the slider according to the second embodiment of the present invention having the arrangements described above, when an impact force acts, during operation of the magnetic disk drive apparatus, on the position 132 of the dimple 23 of the slider 1 having the submount including the laser diode mounted thereon, the inertia force proportional to the distance between the center of mass 131 of the slider having the submount including the laser diode mounted thereon and the position 132 of the dimple 23 can be made small. This prevents the roll angle from becoming large. There is no chance of contact with the disk even with a large impact force, moreover, allowing flying with a small roll angle.

Figure 20:
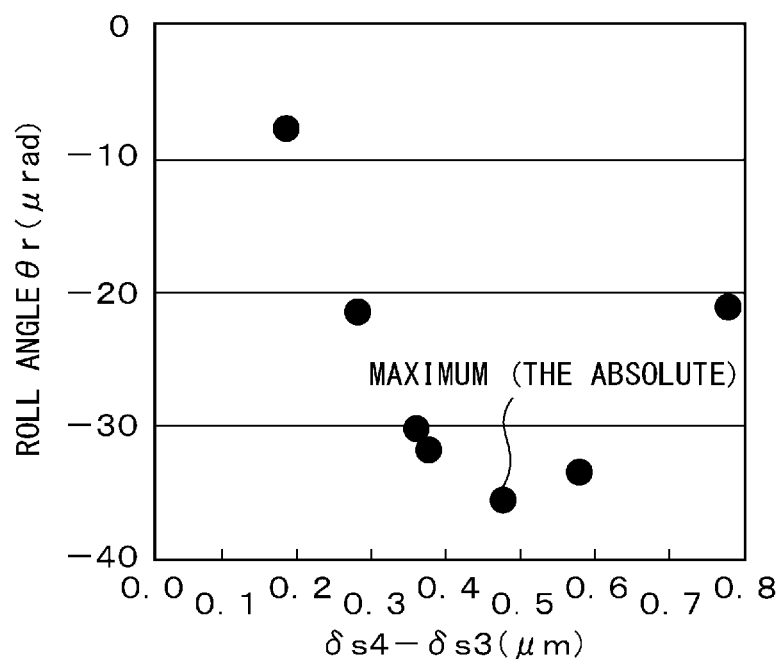
FIG. 20 is a graph showing calculations of the roll angle relative to a difference between depths of shallow grooves of side pads formed on both sides in the magnetic head slider according to the second embodiment.

FIG. 20 is a graph showing calculations of the roll angle relative to a difference between the depths of the shallow groove surfaces of the side pads formed on both sides, when the magnetic head slider according to the second embodiment of the present invention flies under constant conditions of an altitude of 0 m, a speed of 5400 rpm, and a disk radius (medium condition for a 2.5" apparatus). It is noted that the suspension preload "F" is 20.9 mN and the dimple position "Xp" is 0.5. The shallow groove depth "δs4" of the side pad disposed on the inner side of a down type slider having the submount 3 including the laser diode mounted on the inner side surface thereof is set to be larger than the shallow groove depth "δs3" of the side pad on the outer side.

The figure tells that increasing the difference between the shallow groove depths of the side pads on both sides δs4−δs3 makes the roll angle greater to reach its maximum value. This means that there is a difference in shallow groove depth at which the difference in positive-pressure lifting force between the side pads on the inner and outer sides is a maximum. Such a difference in shallow groove depth exists because the lifting forces are saturated at those shallow groove depths.

Third Embodiment

A slider according to a third embodiment of the present invention, and a magnetic disk drive apparatus having the same will be described in detail below.

Figure 21:
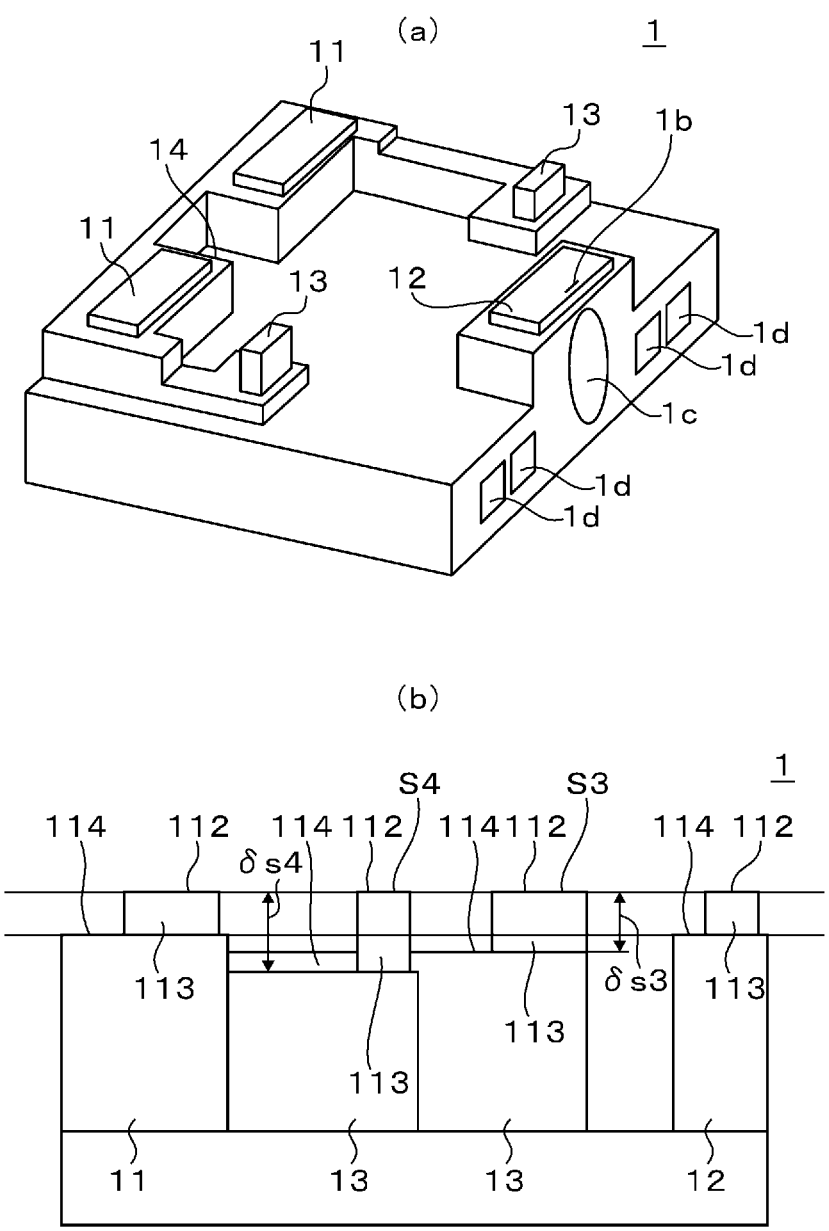
FIGS. 21(*a*) and 21(*b*) are a three-dimensional perspective view and a side elevational view, respectively, showing a magnetic head slider according to a third embodiment of the present invention.

FIGS. 21(a) and 21(b) are a three-dimensional perspective view and a side elevational view, respectively, showing the magnetic head slider according to the third embodiment of the present invention. As evident from FIG. 21(a), the slider 1 includes a pair of leading pads 11, a trailing pad 12, and a pair of side pads 13. The leading pads 11 are formed on a leading side and can assume air bearing surfaces. The trailing pad 12 is formed on a trailing side and can assume an air bearing surface. The side pads 13 are formed on both sides and can assume air bearing surfaces. In addition, in the third embodiment, the leading pads 11 and the side pads 13 are connected to each other. As is also shown in FIG. 21(b), "δs3" and "δs4" represent depths of step surfaces 114 (shallow groove surfaces) relative to contact surfaces 112 of the side pads 13 formed on both sides, respectively. Additionally, "S3" and "S4" represent areas of the contact surfaces 112 of the side pads 13 formed on both sides in the airflow direction, respectively. Further, the magnetic head slider according to the third embodiment of the present invention is arranged so that the condition indicated by S3<S4 or S3>S4 or the condition indicated by δs3<δs4 or δs3>δs4 is satisfied.

Fourth Embodiment

Finally, a magnetic disk drive apparatus according to a fourth embodiment of the present invention will be described in detail.

Figure 22:
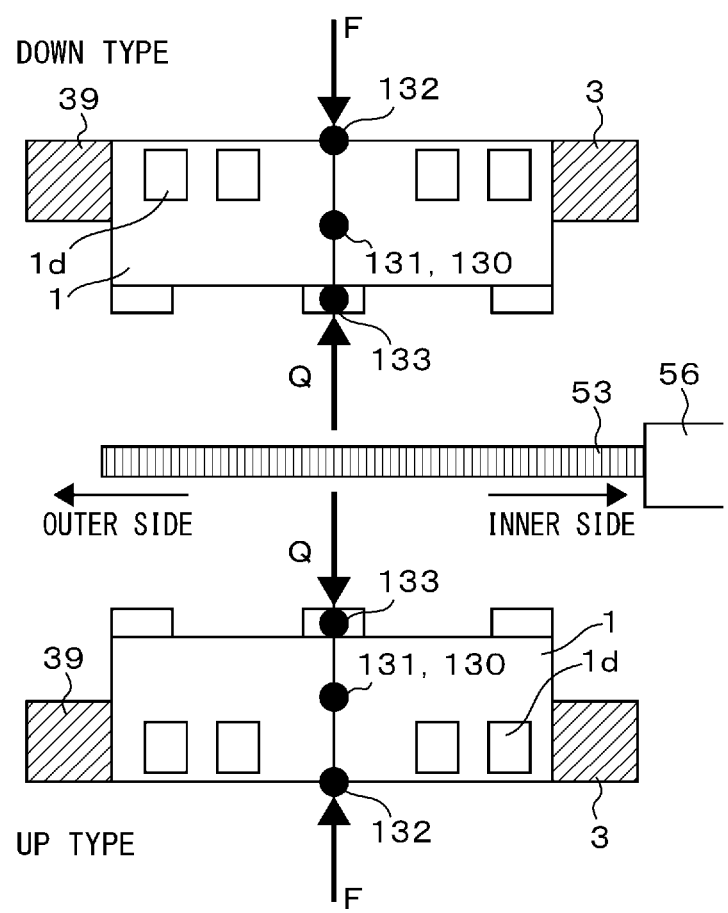
FIG. 22 is a side elevational view showing a magnetic head slider according to a fourth embodiment during its flying.

FIG. 22 is a side elevational view showing a magnetic head slider according to the fourth embodiment. The magnetic head slider has a submount 3 including a laser diode mounted on a side surface thereof on an inner side and flying over a surface of a magnetic recording medium 53, viewed from a roll direction (a seek direction). In addition, the magnetic head slider according to the fourth embodiment includes a member 39 having mass identical to that of the submount 3 including the laser diode, mounted on a side surface on the outer side of the slider 1. The foregoing arrangement results in a center of mass 131 of the slider having the submount including the laser diode mounted on the inner side surface thereof being equal to a center of mass 130 of the slider as a single component, so that an offset "b" that represents a difference in position between the two centers of mass is zero (0). Alternatively, the member 39 is mounted on the side surface of the slider 1 on the outer side so that the offset "b" is zero (0).

The foregoing arrangements allow the pressure center position of the lifting force of the slider 1 and the dimple position moved in the slider width direction can be aligned with each other on a straight line. Additionally, a position 132 of a dimple 23 as the load acting point, the pressure center position of the lifting force of the slider 1, and the center of mass 131 of the slider having the submount including the laser diode mounted on the inner side surface thereof can be easily arranged on a straight line so as to fall in an identical position. When an impact force acts on the position 132 of the dimple 23 of the slider having the submount including the laser diode mounted thereon during operation of the magnetic disk drive apparatus, the roll angle does not become large and there is no chance of contact with the disk even with a large impact force, moreover, allowing flying with a small roll angle.

Figure 23:
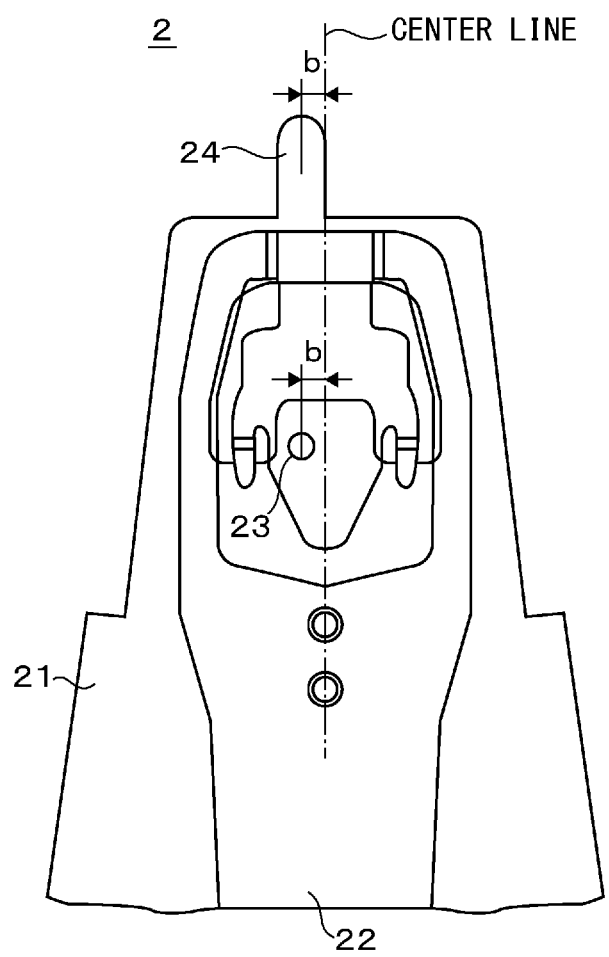
FIG. 23 is a plan view showing another suspension of the magnetic head slider according to the first embodiment.
Figure 24:
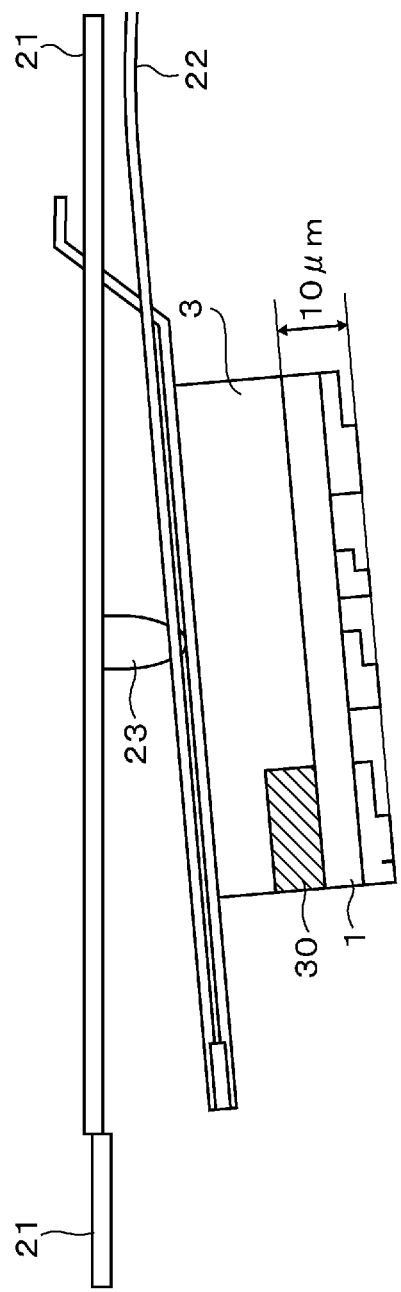
FIG. 24 is a side elevational view showing the magnetic head slider according to the first embodiment viewed from the pitch direction (slider longitudinal direction) and also indicating a distance between the submount and the air bearing surface.

The following describes, with reference to FIGS. 23 and 24, a method for manufacturing the magnetic head slider according to the first embodiment including a down type slider 1 having the submount 3 including the laser diode mounted on the inner side surface thereof. The slider has a femto size having a length of 850 μm, a width of 700 μm, and a thickness of 230 μm. The slider is made from alumina titanium carbide and has a mass of 0.582 mg.

(1) If gallium arsenide and aluminum nitride are used for the laser diode and the submount, respectively, and mass and width of the submount including the laser diode, and a laser diode length are 0.101 mg, 280 μm, and 280 μm, respectively, then the offset amount "b"=−70 μm. The magnetic head slider 1 according to the first embodiment having the submount 3 including the laser diode mounted thereon has a mass of 0.683 mg.

(2) The air bearing surfaces of the slider are subjected to etching on an ion beam etching system using an existing lithography technique. The air bearing surfaces are to be machined so that the area "S4" of the contact surface 112 of the side pad on the inner side is 0.0156 mm$^2$, the area "S3" of the contact surface 112 of the side pad on the outer side is 0.00721 mm$^2$, "δs3" is 0.18 μm, and "δs4" is 0.18 μm. The resultant air bearing surface shape will hereinafter be referred to as an "ABS1". The pressure center position of the air bearing surface shape "ABS1" is offset −70 μm in the slider width direction from the slider center position.

(3) A suspension as shown in FIG. 10(a) is manufactured in which the position of the dimple 23 is offset −70 μm in the slider width direction from the centerline of the suspension. Another suspension as shown in FIG. 23 is also manufactured in which the position of the dimple 23 and a hook 24 are offset −70 μm in the slider width direction from the centerline of the suspension 2.

(4) The slider machined by the step of (2) above and the suspension as shown in FIG. 10(a) are bonded and wired together.

(5) A submount including a laser diode is manufactured. If the slider thickness is 230 μm, the submount preferably has a thickness of 150 μm. This is to prevent contact with the submount by allowing a distance of 10 μm or more between the air bearing surface and the submount surface even with large part-to-part variations in the submount and a large roll angle.

(6) As shown in FIG. 24, the manufactured submount 3 including the laser diode 30 is bonded to the side surface on the inner side of the slider machined by the step of (2) above, ensuring that the inlet through which laser light emitted from the active layer 31 of the laser diode 30 passes is aligned with the waveguide inlet 17. The bonding should also ensure that the distance between the air bearing surface and the submount surface is 10 μm or more.

FIGS. 25(a) to 25(c) are graphs showing measurements of the flying height at reader, the pitch angle, and the roll angle when the disk velocity varies from 11.88 m/s to 21.99 m/s with a yaw angle of 0 degrees kept constant, for five magnetic head sliders according to the first embodiment of the present invention manufactured through the steps of (1) to (6) described above. The figures reveal that measured values of the flying height at reader, the pitch angle, and the roll angle are lower than calculated values by 2 nm, 6 μrad, and 6 μrad, respectively. These measurements coincide with a relation between a measured flying height and a theoretical flying height of the prior art slider. This confirms that the slider according to the first embodiment of the present invention exhibits sufficiently satisfactory dependence of the flying height on the disk velocity. It is further known that light and dark patterns of interference fringes formed on the air bearing surface during measurement of the flying height indicate steady flying. Additionally, variations in the flying height at reader arising from part-to-part variations in the five sliders is ±2 nm, indicating reasonable values in the same trend as the prior art slider.

Figure 26:
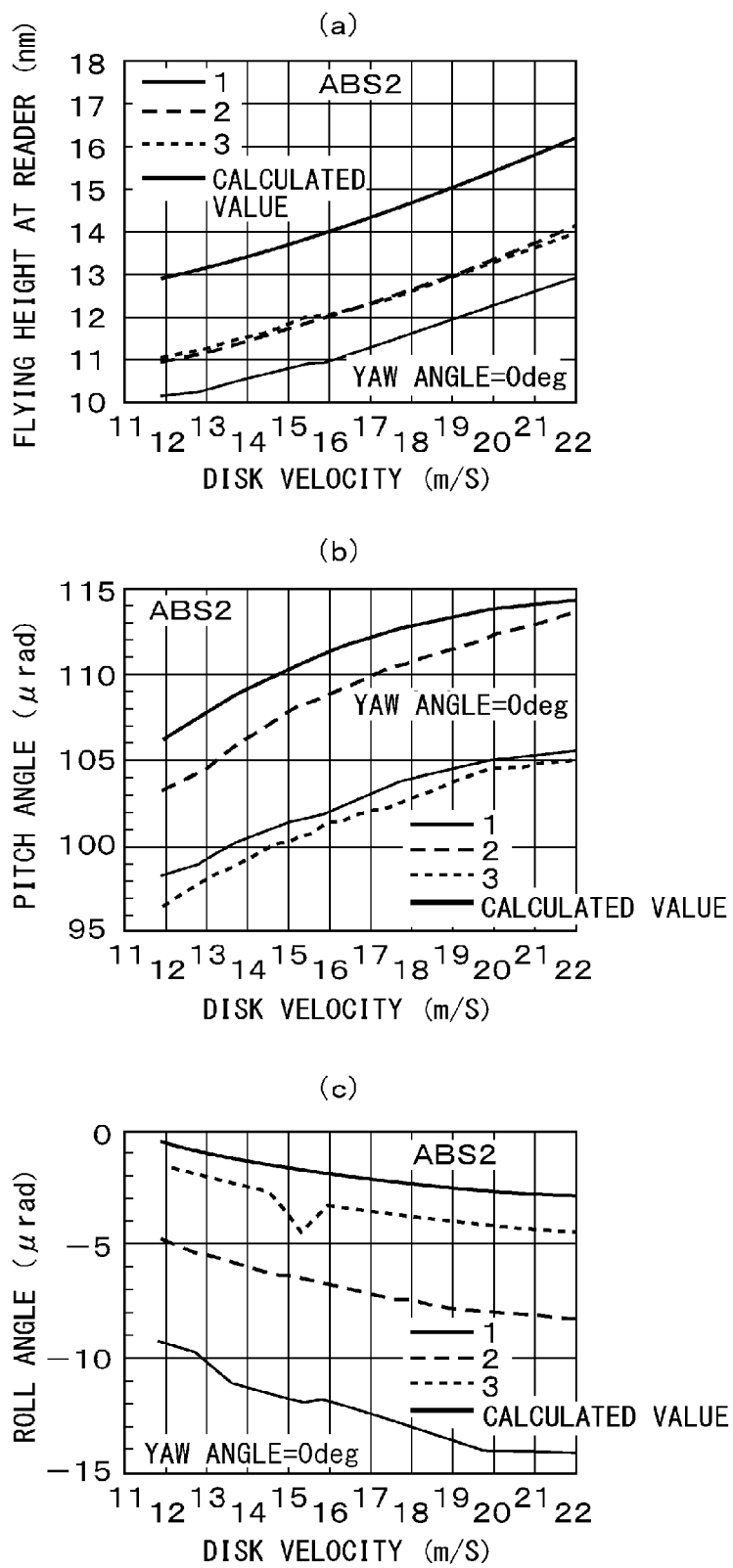
FIGS. 26(*a*) to 26(*c*) are graphs showing measurements of the flying height of another magnetic head slider according to the first embodiment.

FIGS. 26(a) to 26(c) are graphs showing measurements of the flying height at reader, the pitch angle, and the roll angle when the disk velocity is varied from 11.88 m/s to 21.99 m/s with a yaw angle of 0 degrees kept constant, for three another magnetic head sliders according to the first embodiment of the present invention manufactured through the steps of (1) to (6) described above. Gallium arsenide and aluminum nitride were used for the laser diode and the submount, respectively. If mass and width of the submount including the laser diode, and a laser diode length are 0.072 mg, 200 µm, and 200 µm, respectively, then the offset amount "b"=−48 The manufactured air bearing surfaces are such that the area "S4" of the contact surface 112 of the side pad on the inner side is 0.0156 mm$^2$, the area "S3" of the contact surface 112 of the side pad on the outer side is 0.00118 mm$^2$, "δs3" is 0.18 µm, and "δs4" is 0.18 The resultant air bearing surface shape will hereinafter be referred to as an "ABS2". The pressure center position of the air bearing surface shape "ABS2" is offset 48 µm in the slider width direction from the slider center position. A suspension was also manufactured in which the position of the dimple is offset 48 µm in the slider width direction from the slider center position. The figures reveal that measured values of the flying height at reader, the pitch angle, and the roll angle are lower than calculated values by 2 nm, 6 µrad, and 6 µrad, respectively. These measurements coincide with the relation between the measured flying height and the theoretical flying height of the prior art slider. This confirms that the slider according to the first embodiment of the present invention exhibits sufficiently satisfactory dependence of the flying height on the disk velocity. It is further known that light and dark patterns of interference fringes formed on the air bearing surface during measurement of the flying height indicate steady flying. Additionally, variations in the flying height at reader arising from part-to-part variations in the three sliders is ±2 nm, indicating reasonable values in the same trend as the prior art slider.

Figure 27:
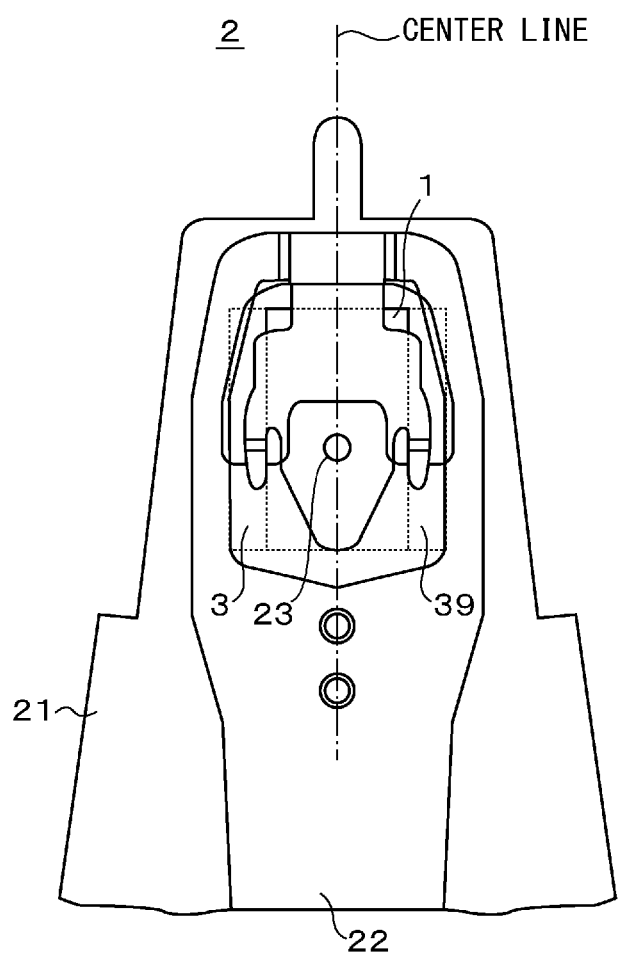
FIG. 27 is a plan view showing a magnetic head slider and a suspension thereof according to a fourth embodiment.

The following describes, with reference to FIG. 27, a method for manufacturing the magnetic head slider according to the fourth embodiment including a down type slider 1 having the submount 3 including the laser diode mounted on the inner side surface thereof. The slider has a femto size. The slider is made from alumina titanium carbide and has a mass of 0.582 mg.

(1) Gallium arsenide and aluminum nitride are used for the laser diode and the submount, respectively, and mass and width of the submount including the laser diode, and a laser diode length are 0.101 mg, 280 µm, and 280 µm, respectively.

(2) The air bearing surfaces of the slider are subjected to etching on an ion beam etching system using an existing lithography technique. The pressure center position of the air bearing surface is the slider center position.

(3) A suspension is manufactured in which the dimple position and the hook are at the slider center position.

(4) The slider machined by the step of (2) above and the suspension manufactured by the step of (3) above are bonded and wired together.

(5) A submount including a laser diode is manufactured. The slider's thickness is set to 230 µm and the submount's thickness is set to 150 µm. This is done to prevent contact with the submount by allowing a distance of 10 µm or more between the air bearing surface and the submount surface even with large part-to-part variations in the submount and a large roll angle.

(6) The submount including the laser diode manufactured through the step of (5) above is bonded to the side surface on the inner side of the slider machined by the step of (2) above. At this time, ensure that the inlet through which laser light emitted from the active layer 31 of the laser diode passes is aligned with the waveguide inlet 17. The bonding should also ensure that the distance between the air bearing surface and the submount surface is 10 µm or more.

(7) A dummy submount 39 having a mass of 0.101 mg as that of the submount including the laser diode is manufactured. The material used for the dummy submount 39 is aluminum nitride. Because of the different materials used for the laser diode and the submount, each needs to have an individual shape in order to have the same mass and the same center of mass. The dummy submount is arranged to have a width and a thickness of 280 µm and 150 µm, respectively, and to achieve a mass of 0.101 mg, the dummy submount is arranged to have a length of 734 µm.

If the mass, width, and the laser diode length of the submount including the laser diode are 0.072 mg, 200 µm, and 200 µm, respectively, the dummy submount is arranged to have a width and a thickness of 200 µm and 150 µm, respectively, and to achieve a mass of 0.072 mg, the dummy submount is arranged to have a length of 734 µm.

Figure 25:
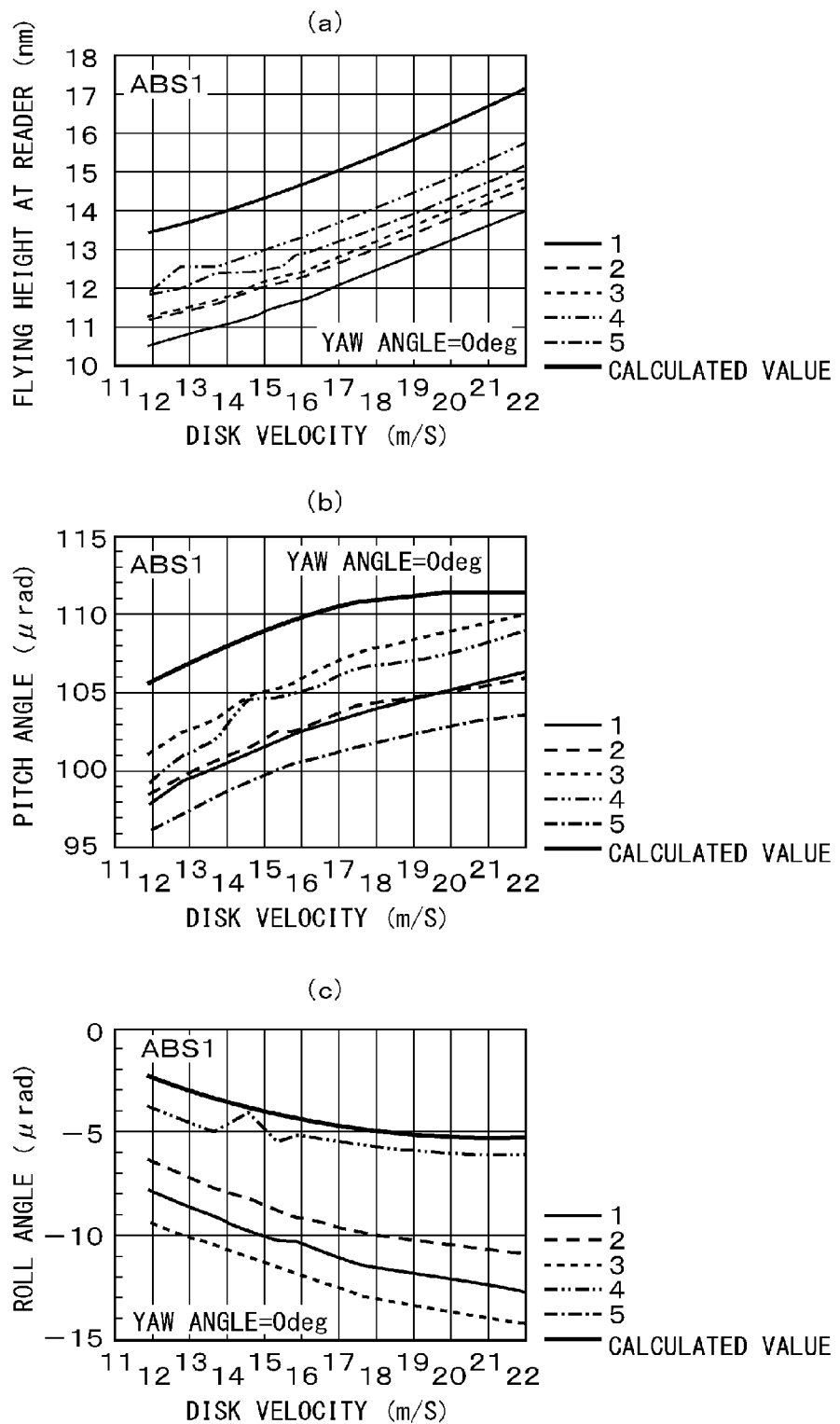
FIGS. 25(*a*) to 25(*c*) are graphs showing measurements of the flying height of the magnetic head slider according to the first embodiment.

(8) As shown in FIG. 25, the dummy submount manufactured through the step of (7) above is bonded to a side surface on another side of the inner side of the slider. The magnetic head slider according to the fourth embodiment having the submount 3 including the laser diode and the dummy submount mounted thereon has a mass of 0.783 mg that is 1.2 times as much as the mass of 0.582 mg of the femto slider as a single component.

FIGS. 28(a) and 28(b) are graphs showing measurements of the suspension preload taken from five manufactured magnetic head sliders with a laser diode length of 280 µm according to the fourth embodiment of the present invention and from the prior art slider. The figures reveal that there is no difference in suspension preload between the slider of the fourth embodiment and the slide of the prior art and mounting the submount including a laser diode and the dummy submount does not affect the suspension preload.

Table 1 given below show observations of how an operating slider jumps up, as observed with a high-speed camera that images a magnetic head slider according to the fourth embodiment of the present invention mounted on a magnetic disk drive apparatus, the magnetic head slider being manufactured to have a laser diode length of 280 µm. Table 1 also shows observations of how an operating prior art slider mounted on a magnetic disk drive apparatus jumps up, as observed with a high-speed camera. The symbol "NG" denotes that the slider jumps up and the symbol "OK" denotes that the slider does not jump. The table reveals that the maximum acceleration at which the operating slider jumps up is 2940 m/s$^2$ (300 G) both for the slider according to the fourth embodiment of the present invention and the prior art slider. It is thus known that mounting both the submount including the laser diode and the dummy submount does not affect impact resistance. Alternatively, it is known that the mass of the slider according to the fourth embodiment having the submount including the laser diode and the dummy submount mounted thereon increases to 0.783 mg that is 1.2 times as much as the mass of 0.582 mg of the femto slider as a single component, which does not affect impact resistance.

TABLE 1

| ACCELERATION | PRIOR ART | ACCELERATION | PRESENT INVENTION |
|---|---|---|---|
| | | 2450 m/s$^2$ | OK |
| 2695 m/s$^2$ | OK | 2695 m/s$^2$ | OK |
| | | 2793 m/s$^2$ | OK |
| 2940 m/s$^2$ | NG | 2940 m/s$^2$ | NG |
| 3430 m/s$^2$ | NG | 3185 m/s$^2$ | NG |

The reason for the foregoing is the following. Specifically, equivalent mass of the entire slider and suspension does affect the impact resistance; however, the increase of the mass of the slider to a value 1.2 times as much results in only a small increase in the equivalent mass of the entire slider and suspension, and thus effect on the impact resistance is considered to be limited.

| | Description of Reference Numerals |
|---|---|
| 1 | Magnetic head slider |
| 11 | Leading pad |
| 12 | Trailing pad |
| 13 | Side pad |
| 14 | Negative-pressure pocket portion |
| 112 | Pad surface (contact surface) in contact with medium surface when disk is stationary |
| 113, 115 | Shoulder |
| 114 | Step surface (shallow groove surface) via shoulder 113 |
| 116 | Step surface (deep groove surface) via shoulder 115 |
| 131 | Position of center of mass of slider having submount including laser diode mounted thereon |
| 101 | Position of center of mass of slider 1 as a single component |
| 1b | Read/write element |
| 1c | Magnetic head |
| 1d | Wire pad |
| δs3, δs4 | Depth of shallow groove of side pad 13 |
| s3, s4 | Area of contact surface 112 of side pad 13 |
| 2 | Suspension |
| 21 | Load beam portion |
| 22 | Gimbal portion |
| 23 | Dimple, load protuberance portion |
| 24 | Hook |
| 132, (Xp,Yp) | Position of dimple, position of load protuberance portion, load acting point |
| xp | Distance from leading end of slider 1 |
| yp | Distance from end of side surface of slider 1 |
| L | Longitudinal length of slider 1 |
| w | Transverse length of slider 1 |
| F | Suspension preload |
| Q | Lifting force |
| 133 | Pressure center position of slider 1 |
| Qin | Positive-pressure lifting force of side pad on inner side |
| Qout | Positive-pressure lifting force of side pad on outer side |
| θp | Pitch angle |
| θr | Roll angle |
| h2 | Trailing end flying height |
| hmin | Minimum flying height |
| hr | Flying height at reader |
| Mp | Initial pitching moment acting around dimple position |
| b | Offset |
| 3 | Submount including laser diode |
| 39 | Member (dummy submount) |
| 53 | Magnetic recording medium |
| 5 | Magnetic disk drive apparatus |
| 56 | Drive unit that rotates magnetic recording medium |
| 58 | Positioning suspension arm |
| 59 | Drive unit that drives positioning suspension arm |
| 99 | Circuit that processes read/write signals |
| 10 | Suspension flexure |
| 30 | Laser diode |
| 15 | Waveguide core |
| 16 | Near-field transducer |
| 31 | Active layer |
| 33 | Electrode |
| 37 | Conductive adhesive |
| 90 | Antireflection layer |
| 17 | Waveguide inlet |
| 19 | Spot-size converter |

The invention claimed is:

1. A magnetic disk drive apparatus comprising:
a magnetic head slider apparatus, the magnetic head slider apparatus comprising:
a magnetic head slider, the magnetic head slider including:
a leading pad formed on a leading side on a first surface of a slider main body, the leading pad contacting a medium surface when a disk is stationary;
a trailing pad formed on a trailing side on the first surface of the slider main body, the trailing pad contacting the medium surface when the disk is stationary;
a pair of side pads formed in an airflow direction on the first surface of the slider main body, the side pads contacting the medium surface when the disk is stationary, the leading pad, the trailing pad, and the side pads each having two step surfaces via shoulders extending in a direction of being farther from a contact surface of each pad;
a main magnetic pole write head;
a magnetoresistive read element;
a near-field transducer disposed at a position close to the main magnetic pole write head; and
a waveguide for guiding external light to the near-field transducer, the main magnetic pole write head, the magnetoresistive read element, the near-field transducer, and the waveguide being disposed inside the magnetic head slider;
a submount disposed on a first side surface of the magnetic head slider, the submount including a light-emitting element that emits light for the near-field transducer; and
a suspension for supporting the magnetic head slider and the submount integrally at a leading end portion thereof, the suspension including a dimple that applies a load to the magnetic head slider, wherein
letting "w" be a length of the magnetic head slider in a width direction and "yp" be a distance between an end of a side surface of the magnetic head slider and a position of the dimple, the "yp" and the "w" fall within a range that satisfies a condition represented by yp/w<0.5 or yp/w>0.5;
a magnetic recording medium disposed rotatably so as to face a magnetic head slider of the magnetic head slider apparatus;
a slider drive unit for driving the magnetic head slider apparatus;
a disk drive unit for rotatably driving the magnetic recording medium; and a signal processing circuit for processing read/write signals to be supplied to a magnetic head of the magnetic head slider apparatus.

2. The magnetic head slider apparatus according to claim 1, wherein, letting "S3" and "S4" be areas of the contact surfaces of the side pads, respectively, the "S3" and the "S4" fall within a range that satisfies a condition represented by S3<S4 or S3>S4.

3. The magnetic head slider apparatus according to claim 1, wherein, letting "ds3" and "ds4" be depths of first step surfaces relative to the contact surfaces of the side pads, respectively, the "ds3" and the "ds4" fall within a range that satisfies a condition represented by ds3<ds4 or ds3>ds4.

4. A magnetic disk drive apparatus comprising:
a magnetic head slider apparatus, the magnetic head slider apparatus comprising:
a magnetic head slider, the magnetic head slider including:
a leading pad formed on a leading side on a first surface of a slider main body, the leading pad contacting a medium surface when a disk is stationary;
a trailing pad formed on a trailing side on the first surface of the slider main body, the trailing pad contacting the medium surface when the disk is stationary;
a pair of side pads formed in an airflow direction on the first surface of the slider main body, the side pads contacting the medium surface when the disk is stationary, the leading pad, the trailing pad, and the side pads each having two step surfaces via shoulders extending in a direction of being spaced away from a contact surface of each pad;
a main magnetic pole write head;
a magnetoresistive read element;
a near-field transducer disposed at a position close to the main magnetic pole write head; and
a waveguide for guiding external light to the near-field transducer, the main magnetic pole write head, the magnetoresistive read element, the near-field transducer, and the waveguide being disposed inside the magnetic head slider;
a submount disposed on the magnetic head slider, the submount including a light-emitting element that emits light for the near-field transducer; and
a suspension for supporting the magnetic head slider and the submount integrally at a leading end portion thereof, the suspension including a dimple that applies a load to the magnetic head slider, wherein
the magnetic head slider further comprises a member having mass equivalent to that of the submount, the member and the submount being paired up to be disposed on both sides of two mutually opposed side surfaces of the magnetic head slider so that a difference from a center of mass of the magnetic head slider has no offset;
a magnetic recording medium disposed rotatably so as to face a magnetic head slider of the magnetic head slider apparatus;
a slider drive unit for driving the magnetic head slider apparatus;
a disk drive unit for rotatably driving the magnetic recording medium; and
a signal processing circuit for processing read/write signals to be supplied to a magnetic head of the magnetic head slider apparatus.

5. The magnetic head slider apparatus according to claim 4, wherein the magnetic head slider having the submount including the light-emitting element that emits light for the near-field transducer and the member having the same mass as the submount including the light-emitting element that emits light for the near-field transducer mounted on both side surfaces thereof has mass that is greater than mass of a femto slider as a single component and equal to, or less than, 0.783 mg.

* * * * *